United States Patent
Aliseychik et al.

(10) Patent No.: US 9,043,770 B2
(45) Date of Patent: May 26, 2015

(54) PROGRAM MODULE APPLICABILITY ANALYZER FOR SOFTWARE DEVELOPMENT AND TESTING FOR MULTI-PROCESSOR ENVIRONMENTS

(71) Applicant: LSI Corporation, San Jose, CA (US)

(72) Inventors: Pavel Aleksandrovich Aliseychik, Moscow (RU); Petrus Sebastiaan Adrianus Daniel Evers, Temple, PA (US); Denis Vasilevich Parfenov, Moscow (RU); Alexander Nikolaevich Filippov, Moscow (RU); Denis Vladimirovich Zaytsev, Dzerzhinsky Moscow Region (RU)

(73) Assignee: LSI Corporation, San Jose, CA (US)

( * ) Notice: Subject to any disclaimer, the term of this patent is extended or adjusted under 35 U.S.C. 154(b) by 215 days.

(21) Appl. No.: 13/747,602

(22) Filed: Jan. 23, 2013

(65) Prior Publication Data
US 2014/0007043 A1  Jan. 2, 2014

(30) Foreign Application Priority Data
Jul. 2, 2012  (RU) ................................ 2012127578

(51) Int. Cl.
*G06F 9/45* (2006.01)
*G06F 9/46* (2006.01)
(Continued)

(52) U.S. Cl.
CPC .............. *G06F 8/70* (2013.01); *G06F 11/3612* (2013.01); *G06F 8/456* (2013.01); *G06F 9/4881* (2013.01);
(Continued)

(58) Field of Classification Search
CPC ............ G06F 11/3664; G06F 11/3684; G06F 11/3668; G06F 8/443; G06F 8/41; G06F 8/30; G06F 11/3612; G06F 8/456; G06F 9/4881; G06F 9/46; G06F 2209/486; G06F 9/3836
See application file for complete search history.

(56) References Cited

U.S. PATENT DOCUMENTS 6,092,097 A * 7/2000 Suzuoka ....................... 717/149
7,895,453 B2 2/2011 Kasahara et al.
(Continued)

OTHER PUBLICATIONS

Martin Niemeier et al.; Partitiioned real-time scheduling on heterogeneous shared-memory multiprocessors; 2011; retrieved online on Mar. 3, 2015; pp. 1-10. Retrieved from the Internet: <URL: http://infoscience.epfl.ch/record/164509/files/scheduling.pdf>.*
(Continued)

*Primary Examiner* — Thuy Dao
*Assistant Examiner* — Hanh T Bui
(74) *Attorney, Agent, or Firm* — Suiter Swantz pc llo

(57) ABSTRACT

In one embodiment, a machine-implemented method programs a heterogeneous multi-processor computer system to run a plurality of program modules, wherein each program module is to be run on one of the processors The system includes a plurality of processors of two or more different processor types. According to the recited method, machine-implemented offline processing is performed using a plurality of SIET tools of a scheduling information extracting toolkit (SIET) and a plurality of SBT tools of a schedule building toolkit (SBT). A program module applicability analyzer (PMAA) determines whether a first processor of a first processor type is capable of running a first program module without compiling the first program module. Machine-implemented online processing is performed using realtime data to test the scheduling software and the selected schedule solution.

20 Claims, 12 Drawing Sheets

(51) Int. Cl.
*G06F 9/44* (2006.01)
*G06F 9/48* (2006.01)
*G06F 9/50* (2006.01)
*G06F 11/36* (2006.01)

(52) U.S. Cl.
CPC . *G06F 8/41* (2013.01); *G06F 8/314* (2013.01); *G06F 9/5066* (2013.01); *G06F 11/3664* (2013.01)

(56) References Cited

U.S. PATENT DOCUMENTS

| | | | |
|---|---|---|---|
| 7,930,565 B2* | 4/2011 | Saewong et al. | 718/102 |
| 7,984,431 B2* | 7/2011 | Kejariwal et al. | 717/151 |
| 8,028,299 B2* | 9/2011 | Holt | 717/149 |
| 8,190,807 B2 | 5/2012 | Reid et al. | |
| 8,555,284 B2 | 10/2013 | Cazorla Almeida | |
| 2006/0053416 A1* | 3/2006 | Watanabe | 717/151 |
| 2006/0195846 A1* | 8/2006 | Benedetti | 718/102 |
| 2007/0255929 A1 | 11/2007 | Kasahara et al. | |
| 2007/0300213 A1* | 12/2007 | Adolphson et al. | 717/151 |
| 2008/0114937 A1 | 5/2008 | Reid et al. | |
| 2008/0134189 A1* | 6/2008 | Holt | 718/102 |
| 2009/0276663 A1 | 11/2009 | Kaksonen | |
| 2010/0115527 A1* | 5/2010 | Kotlyar et al. | 718/104 |
| 2010/0131958 A1 | 5/2010 | Cazorla Almeida | |
| 2013/0019230 A1* | 1/2013 | Nakanishi et al. | 717/149 |
| 2013/0104140 A1* | 4/2013 | Meng et al. | 718/104 |
| 2014/0007043 A1* | 1/2014 | Aliseychik et al. | 717/106 |

OTHER PUBLICATIONS

Isaac Gelado et al.; An Asymmetric Distributed Shared Memory Model for Heterogeneous Parallel Systems; ACM; 2010; retrieved online on Mar. 3, 2015; pp. 347-358; Retrieved from the Internet: <URL: http://delivery.acm.org/10.1145/1740000/1736059/p347-gelado.pdf?>.*

Oliver Arnold and Gerhard Fettweis; On the Impact of Dynamic task Scheduling in Heterogeneous MPSoCs; IEEE; 2011; retreived online on Mar. 3, 2015; pp. 17-24; Retrieved from the Internet: <URL: http://ieeexplore.ieee.org/stamp/stamp.jsp?tp=&arnumber=6045440>.*

Soonhoi et al, "Compile-Time Scheduling and Assignment of Data-Flow Program Graphs with Data-Dependent Iteration," IEEE Transactions on Computers, vol. 40, No. 11, Nov. 1991, pp. 1225-1238.

Youngsoo Shin et al., "Thread-Based Software Synthesis for Embedded System Design," In Proceedings of the 1996 European conference on Design and Test (EDTC '96). IEEE Computer Society, Washington, DC, USA, pp. 282-286.

* cited by examiner

PROGRAM MODULE APPLICABILITY ANALYZER FOR SOFTWARE DEVELOPMENT AND TESTING FOR MULTI-PROCESSOR ENVIRONMENTS

RELATED APPLICATIONS

This application is one of a set of three U.S. patent applications consisting of Ser. No. 13/747,602, Ser. No. 13/749,068, and Ser. No. 13/749,817, all three of which were filed on the same date and the teachings of which are incorporated herein by reference.

BACKGROUND

1. Field of the Invention

The present invention relates to techniques for developing and testing software for multi-processor environments.

2. Description of the Related Art

This section introduces aspects that may help facilitate a better understanding of the invention. Accordingly, the statements of this section are to be read in this light and are not to be understood as admissions about what is prior art or what is not prior art.

A heterogeneous, multi-processor system has a number of different processors of two or more different types that are available to perform a variety of different functions. When designing such a system for a particular application or family of applications, it is desirable to develop software that distributes the application functionality over those multiple different processors in an efficient manner.

For a system comprising processors of different types with arbitrary data exchange facilities and control interconnections, source code texts for application program modules (APMs) designed to be run on dedicated processors (DPs) of one or another type are given. There exists explicit or implicit information concerning which APMs can be run on each different type of DP. This information can either be (i) derived via automatic source code analysis or (ii) supplied in separate files. In general, the system and the APMs satisfy the following conditions:

Every APM can be run on at least one type of DP in the system;
The same APM can be used in a multiplicity of DPs simultaneously or chained, if needed;
Multiple APMs can be run sequentially at the same DP;
All of the DPs are assigned to solve a given set of common complex computational tasks including, in general, case complex data dependencies provided by the given assemblage of APMs.

Developing a schedule for a multi-processor system (i.e., assigning different APMs to the different DPs of such a system and determining the relative timing of the execution of those APMs on those DPs) involves two functions:

1. Checking whether a given computational task is accomplishable using the given population of DPs (i.e., in a given computational basis); and
2. If so, then assigning certain APMs to certain DPs in order to provide correct non-redundant data flow and synchronization while obtaining, for example, minimal throughput latency or a minimal total number of DPs engaged.

Conventional approaches to scheduling leave a considerable part of the job either for a runtime scheduling algorithm or to the application programmer. In the former case, the computational burden of the on-line scheduling function can be unacceptably high and, in the latter case, the mainly manual optimization by developers can take an unreasonable amount of effort.

SUMMARY

In one embodiment, the present invention is a machine-implemented method for programming a heterogeneous multi-processor computer system to run a plurality of program modules, wherein each program module is to be run on one of the processors. The system comprises a plurality of processors of two or more different processor types. According to the recited method, machine-implemented offline processing is performed using a plurality of SIET tools of a scheduling information extracting toolkit (SIET) and a plurality of SBT tools of a schedule building toolkit (SBT).

The plurality of SIET tools comprise (i) a program module applicability analyzer (PMAA) that determines which processor types are capable of running which program modules; (ii) a cycle analyzer that determines timing requirements for each program module running on each capable processor type; (iii) a dependency analyzer that determines data input and output dependencies between different program modules running on capable processor types; and (iv) a data exchange analyzer that determines data transfer requirements between different program modules running on capable processor types.

The plurality of SBT tools comprise (i) an interconnection optimizer that compares different schedule solutions corresponding to different possible assignments of the program modules to the processors; (ii) a schedule builder that selects a subset of one or more of the different schedule solutions based on a first set of use cases; (iii) a synchronization optimizer that develops a synchronization scheme for the subset of schedule solutions; and (iv) a source code generator that generates scheduling software for a selected schedule solution, wherein the scheduling software is to be run on one or more of the processors. Machine-implemented online processing is performed using realtime data to test the scheduling software and the selected schedule solution. The PMAA determines whether a first processor of a first processor type is capable of running a first program module without compiling the first program module.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

System Architecture

Figure 1:
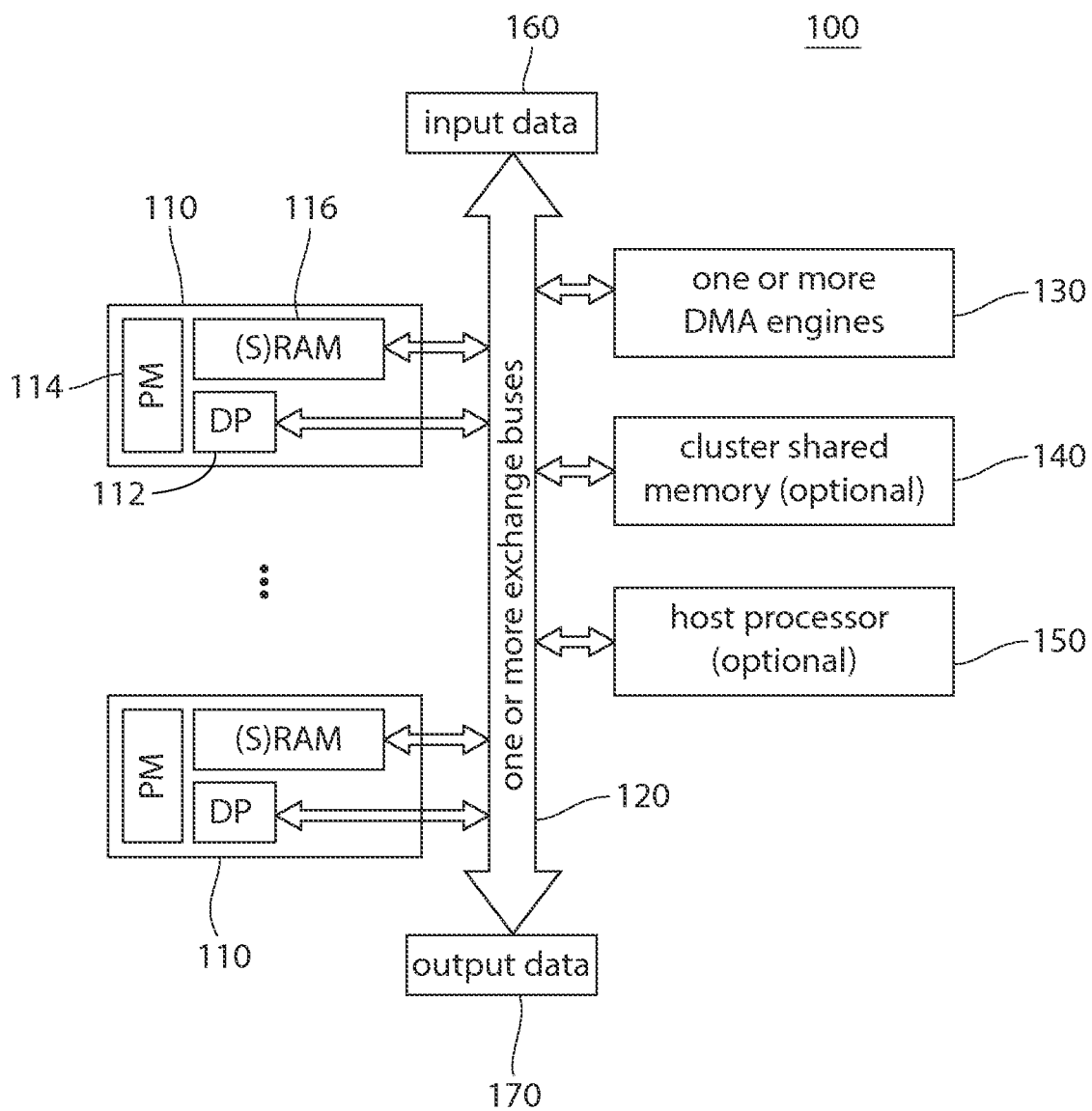
FIG. 1 shows a block diagram of an exemplary heterogeneous, multi-processor system having a number of different processor modules interconnected via one or more exchange buses.

FIG. 1 shows a block diagram of an exemplary heterogeneous, multi-processor system 100 having a number of different processor modules 110 interconnected via one or more exchange buses 120. In addition, system 100 includes one or more DMA (direct memory access) engines 130, (optional) cluster shared memory 140, and an (optional) host processor 150. As depicted in FIG. 1, via the exchange bus(es), system 100 implements an application to convert input data received from an input data source 160 into corresponding output data provided to an output data receiver 170.

Each processor module 110 includes a dedicated processor (DP) 112, a program module (PM) 114, and local memory 116, such as static random access memory (SRAM). Each DP 112 is an independently operating processor (preferably) optimized to perform certain types of operations. As a heterogeneous system, at least two DPs in system 100 are each a different one of at least two different types. As used in this specification, two DPs are said to be of different type if they have different functional capabilities resulting from the hardware of the two DPs being different or the software loaded onto the two DPs being different or both.

Each program module 114 represents a function or a set of functions (in C language terminology) to be run at the same DP. A program module can be either an application program module (APM) or a runtime program module (RPM). An APM is a function or a procedure or a set of dependent functions or procedures intended to be run on the same DP to solve a well-defined part of a task. An RPM is part of the real-time environment (RTE), which is a set of modules that join all of the program modules into a fully operational application. The RTE comprises means of function calling, PM and data transfer synchronization, and data exchange. An RPM is a function or a procedure or a set of dependable functions or procedures that maintains the running of one or more APMs at the same DP and provides the functionality of external synchronization and data transfers. The RTE consists of RPMs running on DPs.

Figure 2:
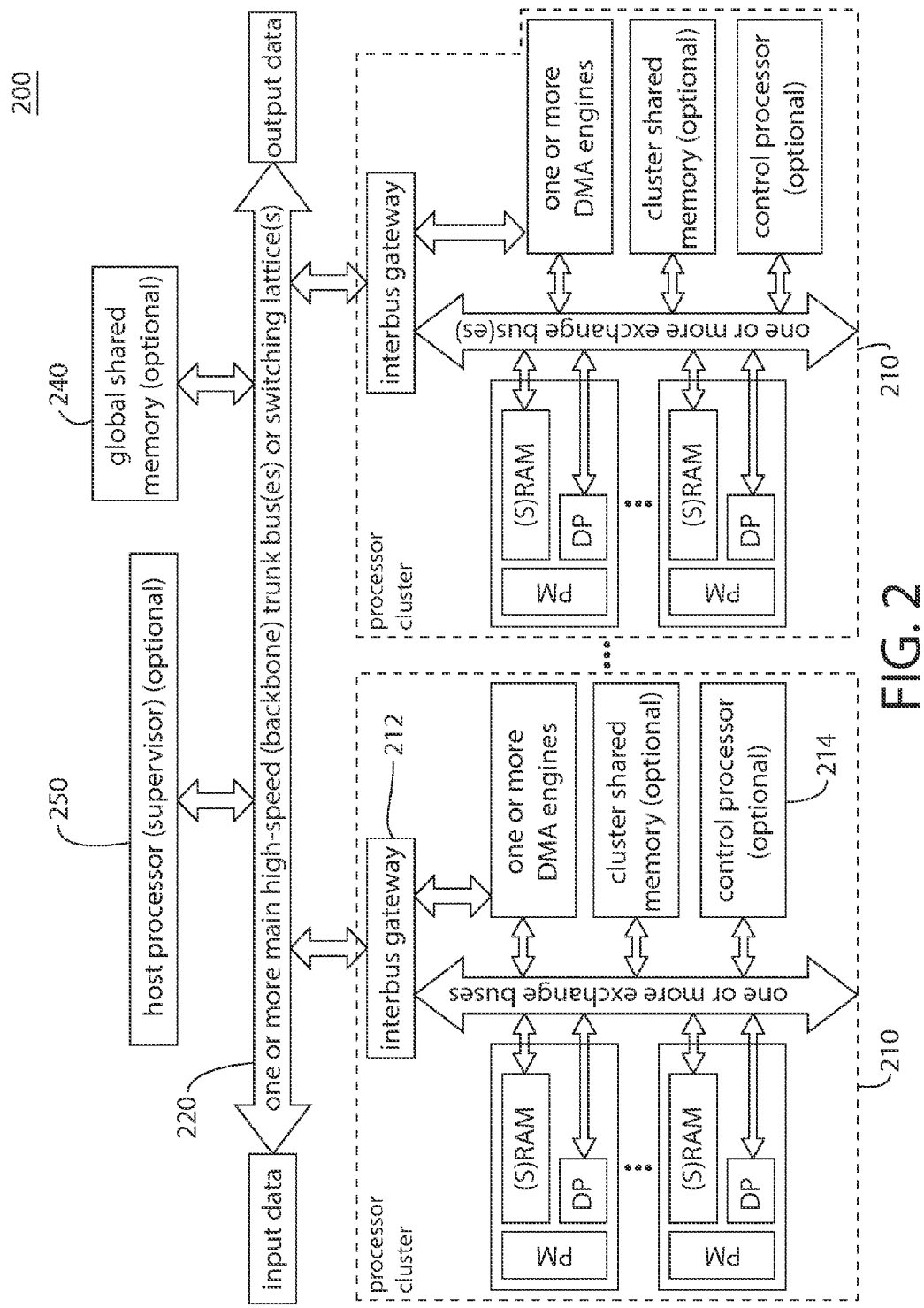
FIG. 2 shows a block diagram of a more-complex, exemplary heterogeneous, multi-processor system having a number of different processor clusters interconnected via one or more high-speed, main (backbone) trunk buses or switching lattices, where each processor cluster is substantially analogous to a different instance of the system of FIG. 1.

FIG. 2 shows a block diagram of a more-complex, exemplary heterogeneous, multi-processor system 200 having a number of different processor clusters 210 interconnected via one or more high-speed, main (backbone) trunk buses or switching lattices 220, where each processor cluster 210 is substantially analogous to a different instance of system 100 of FIG. 1. Note that each processor cluster 210 includes an interbus gateway 212 for connecting the processor cluster to the backbone. In addition, system 200 includes (optional) global shared memory 240 and an (optional) supervisory host processor 250, where each processor cluster 210 has an (optional) control processor 214. As in system 100, as a heterogeneous system, at least two DPs in system 200 are each a different one of at least two different types. Note that, in system 200, the different types of DPs may exist within the same processor cluster 210 or in different processor clusters or a combination thereof.

In general, as used in this specification, the term "heterogeneous, multi-processor system" refers to a system having one or more the following characteristics:

More than one dedicated processor;

Each DP having its own "on-board" local memory;

All DPs interconnected (either directly or indirectly) using a bus or a system of buses;

At least one DMA channel that is programmably accessible from every DP and is capable of addressing memories of different DPs; and Multiple DPs can access memory of another DP either through DMA or via a bus.

In systems like systems 100 and 200 having optional cluster shared memory, that shared memory would be accessible from some or even all of the DPs and can be used to store input, intermediate, or output arrays of data. In addition, the optional control processors or host processor can support the loading and synchronization of the program modules as well as support external interfaces for data exchange and system management.

Scheduling Framework for Software Development and Testing

Figure 3:
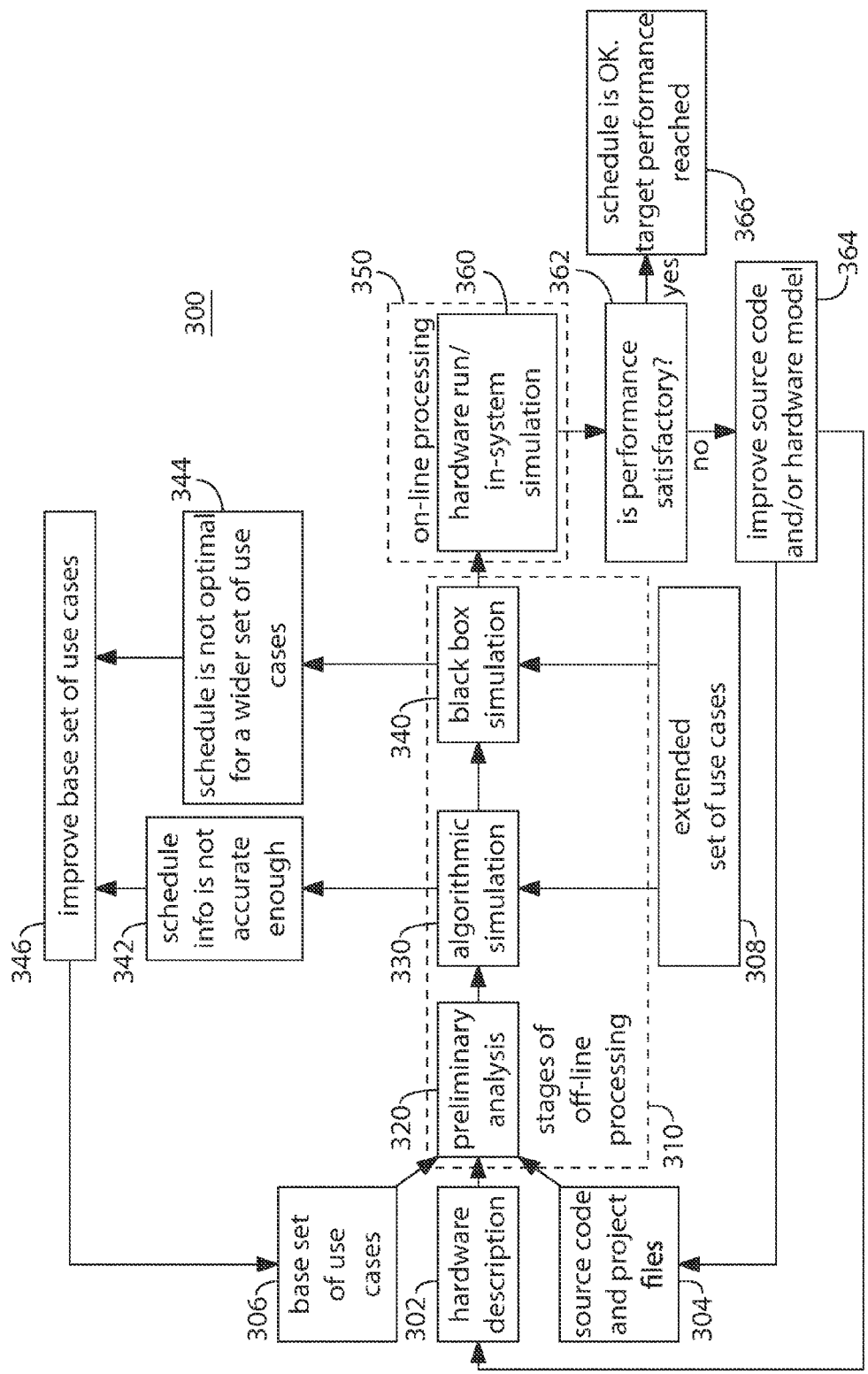
FIG. 3 shows a block diagram of the different phases and stages of a scheduling framework for developing and testing software for multi-processor systems such as the heterogeneous systems depicted in FIGS. 1 and 2.

FIG. 3 shows a block diagram of the different phases and stages of a scheduling framework 300 for developing and testing software for multi-processor systems such as the heterogeneous systems depicted in FIGS. 1 and 2. For a given application to be implemented by a given system, scheduling framework 300 can be used to determine which functions and/or procedures of the application are to be executed on which dedicated processors of the system and the relative timing of those executions to achieve one or more non-conflicting goals and/or balance two or more conflicting goals, such as fast processing speed (i.e., short execution time, low throughput latency), low hardware cost, low power consumption, low memory utilization, and/or low bus utilization.

Scheduling framework 300 addresses the task of automatic data dependencies tracing and provides (sub)optimal call scheduling for multiple APMs designed to be run on a multi-processor system. The multi-processor system may be a homogeneous system having processors of a single type (where symmetric processor architectures are a sub-type) or a heterogeneous system having processors of different types. All APMs are represented in the form of source code written in a general-purpose programming language with concomitant compiling and linkage information added. Every APM can be compiled for at least one type of target processor. The scheduling framework implements an approach for automatic complexity estimation (processor cycle count) and data dependencies analysis based on APM source code and a concept of tools to build a static or a dynamic schedule offline, before running the first of the modules.

Apart from known schedulers, processing is performed in multiple consequent stages: source analysis, schedule optimization, synchronization object assignment, data transfer optimization, processor-centric schedule decomposition, runtime program modules (RPMs) generation, and runtime program modules usage. All the stages except the last one can be performed in advance and as a result provide short optimized runtime program modules for certain target processors. Each runtime program module has the functionality of a wrapper for one or more APMs and performs related synchronization and data transfers, if needed. These output RPMs contain all necessary scheduling information in decentralized form (in scope of given processor only) and are capable of making relatively simple decisions on the fly in the case of data-dependent cycle count. The total runtime complexity of such modules is small compared to conventional schedulers because the modules do not compute the schedule from scratch but rather carry out scheduling decisions already generated offline during preceding stages.

Besides complexity minimization of the runtime part of the scheduler, other advantages are schedule decomposition and its compact representation with capability to support scheduling adaptation to data- and settings-dependent processor cycle count. As accessory features, the scheduling framework provides (a) automatic proof of incapability of computing a given task using a given multiprocessor architecture, (b) data transfer and bus usage optimization profiting from idle processor cycles, and (c) automatic minimization of synchronization objects needed to maintain the schedule.

As depicted in FIG. 3, the scheduling framework has two main phases: an off-line processing phase 310 followed by an on-line processing phase 350. The off-line processing phase includes a preliminary analysis stage 320, followed by an algorithmic simulation stage 330, followed by an (optional) black box simulation stage 340, while the on-line processing phase consists essentially of a hardware run/in-system simulation stage 360.

As shown in FIG. 3, the inputs to the preliminary analysis stage 320 include a model 302 of the hardware architecture of the system, source code and project files 304 for the application to be implemented by the system, and a base set 306 of use cases for that application. In addition, an extended set 308 of use cases for the application is applied during the algorithmic simulation stage 330 and the black box simulation stage 340.

During the off-line processing phase 310, the data flow and timing are analyzed, and the schedule is built and tested using the simulation tools, while, during the on-line processing phase 350, the schedule is tested using the real hardware. In particular, during the preliminary analysis stage 320, the data flow, function dependencies, and timing are analyzed, and the schedule is built. During the algorithmic simulation stage 330, the schedule is tested using the model code of each function. During the black box simulation stage 340, the schedule is tested on the bigger set of use cases, while function code and data transfers are substituted by just the delay. During the hardware run/in-system simulation stage 360, the schedule is tested using the real hardware.

As indicated in FIG. 3, the framework involves an iterative process, in an inner iteration loop of which, during the off-line processing phase, the base set 306 of use cases can be improved (346) as a result of the algorithmic simulation stage 330 and/or the black box simulation stage 340, resulting in a return to and re-execution of the preliminary analysis stage 320. In particular, if the schedule information resulting from the algorithmic simulation stage 330 is not accurate enough (342) or if the schedule resulting from the black box simulation stage 340 is not optimal (344) for the wider set of use cases represented by the extended set 308, then the base set 306 of use cases is improved (346) and processing returns to repeat the preliminary analysis stage 320.

Furthermore, in an outer iteration loop, the source code 304 and/or the hardware model 302 can be improved (364) during the on-line processing phase 350, resulting in a return to and re-execution of the off-line processing phase 310. In particular, if the performance goals are not achieved (362), then either or both of the source code 304 and the hardware model 302 are improved (364) and processing again returns to repeat the preliminary analysis stage 320. When the performance goals are finally reached (366), an acceptable schedule for the system will have been achieved.

Figure 4:
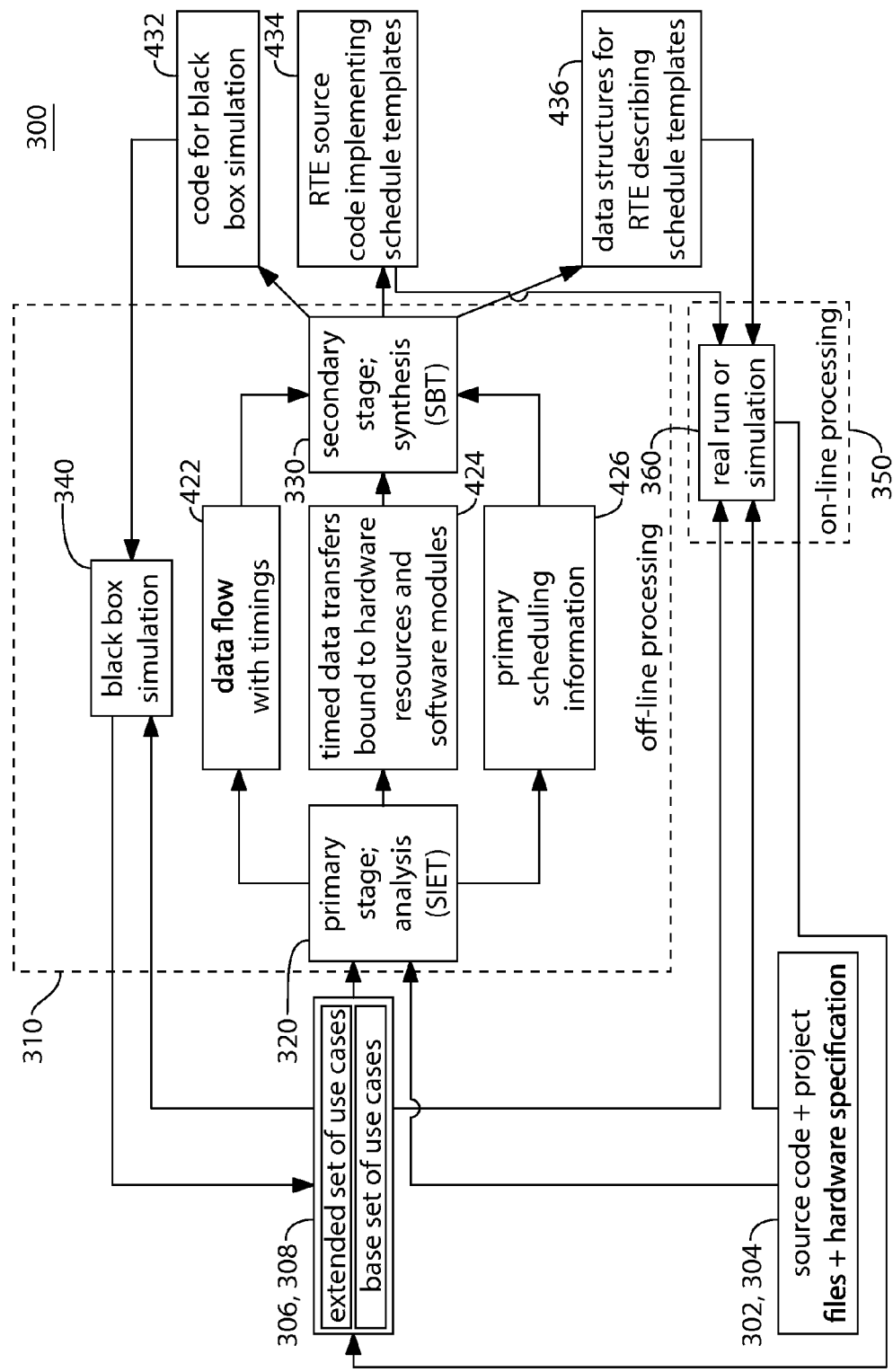
FIG. 4 shows a block diagram of the flow of data within the scheduling framework of FIG. 3.

FIG. 4 shows a block diagram of the flow of data within scheduling framework 300 of FIG. 3. In addition to the elements depicted in FIG. 3, the data flow diagram of FIG. 4 shows the different sets of data generated during the preliminary analysis stage 320 and the algorithmic simulation stage 330. In particular, the data generated during the preliminary analysis stage 320 and provided as input to the algorithmic simulation stage 330 includes data flow 422 with timings, timed data transfers 424 bound to hardware resources and software modules, and primary scheduling information 426. Data generated during the algorithmic simulation stage 330 includes (i) code 432 for the black box simulation stage 340 and (ii) depending on the particular implementation, either (but not both) of (a) RTE (real-time environment) source code 434 implementing schedule templates or (b) data structures 436 for RTE describing schedule templates.

As indicated in FIG. 4, the preliminary analysis stage 320, also referred to as the primary stage, involves the implementation of a number of different scheduling information extraction tools (SIETs), which are a set of software tools for the analysis of source code, compiler, linker, and environment settings, while the algorithmic simulation stage 330, also referred to as the secondary stage, involves the implementation of a number of different schedule building tools (SBTs), which are a set of software tools for schedule or schedule template computation, synchronization, and data transfer optimization and runtime program module (RPM) generation.

Scheduling Information Extraction Tools (SIETs)

An operation system (OS) or runtime environment (RTE) running at all or just some of the DPs is admissible but not necessary. The reason is that an OS/RTE is normally written in a rather general, uniform way and, as a result, consumes too much valuable computation resources for module management. The other way, binding all modules together "by hand" saves noticeable processor computation efforts, but is extremely expensive in aspect of programmers' man-hours and is quite error-prone. The present SIET-based approach makes it much more automatic and provides good background for verification afterwards.

The scheduling framework supports centralized, hierarchic, and distributed computation models but, at its best, it gains for decentralized computations with very complex data flow, because other cases are already well covered by existing well-known techniques.

The described scheduling is applicable for homogeneous computer architectures, such as systolic or vector ones, although it is also applicable for heterogeneous architectures consisting of multiple different processor types of DPs that can be interconnected even in an irregular way.

Although it is not an applicability limitation, the SIET-based approach can provide maximal gain in high-complexity, real-time data stream processing systems, such as base stations in cellular communication, deep network packets (content) processing, video stream processing, etc. These systems typically use well-structured time-limited processing algorithms that allow effective complexity (DP cycle count) evaluation.

The existence of a unique mapping of PMs to either DP types or particular DP entities is not required. Moreover, the present approach delivers the best optimization results when it has the freedom to assign a PM to this or that processor type, on its own choice. The more intersection of processor functionality, the better is optimization attainable here. On the other hand, for the case of completely identical DPs, there are already known in the state of the art successful scheduling solutions.

Suggested multistage processing shows most advantageous results at poorly decomposable (or non-decomposable at all) algorithms where advantages of existing parallelization techniques are minimal.

Being not restricted in computation resources, off-line processing (SIET and SBT) performs all the schedule optimization and generates compact Assembly or high-level programming language code supporting schedule template selection and implementation. Therefore, the resulting schedule templates are incarnated in source code, not in data structures as with known systems. On-line processing starts with relatively light-weight and fast analysis of input data (mostly, its size) and selects an active schedule template. The template is carried automatically by means of generated, tailored RTE code. Thus, rather high scheduling quality is joined with high on-line flexibility and minimal additional computation burden.

System development, testing, and verification framework includes an innovative procedure of base use cases selection to develop a robust and stable (sub)optimal schedule. Under robustness, created schedule templates produce correct computation results for a much wider set of input data than the schedule decisions were based on. The off-line processing may be based on approximate timing and data size estimations that may different significantly from runtime. Nevertheless, a stable schedule should process data in a reasonable time.

The same original ("hand-made") APM source code is reused many times:
- To estimate cycle count vs. data size and settings;
- To determine data dependencies;
- To assign APMs to DPs;
- To optimize data transfers;
- To optimize scheduling templates;
- To generate RTE source code; and
- To create black box simulation framework source code.

Though the tools of SIET and SBT are rather complex, the development cycle is reduced considerably because tricky handwork programming of minimalist RTE and black box simulator are completely automated.

The primary, preliminary analysis stage 320 involves one or more of the following SIETs:
- Program Module Applicability Analyzer (PMAA);
- Cycle Accurate Simulator (CAS) or Cycle Analyzer (CA);
- Dependency Analyzer (DA); and
- Data Exchange Analyzer (DEA).

Program Module Applicability Analyzer (PMAA)

The PMAA determines the types of DPs that can be potentially used to run a given program module (PM) fed with any of a given set of use cases. This tool is mainly responsible for deciding whether a given computational task at large is solvable using a given architecture. This functionality is not covered by a conventional compiler/interpreter because the latter delivers only a binary answer, i.e., 'yes' or 'no' for a single given input data set. The PMAA classifies which use cases can be processed and which exceed hardware capabilities. As extended functionality, it may produce optimization hints for further processing stages.

Input Information:
1. Source code (304 of FIGS. 3 and 4) written in a special or a general purpose program language (such as C, C++, C#, ADA, Modula, etc.). This source code describes algorithms for one or multiple program modules (PMs) to be executed at one or other type of DP and may also comprise preprocessing directives, macro definitions, include files, application- and hardware-specific intrinsics, and project files (e.g., make files). Intrinsics include programming language extensions, which allow using new statements, means of memory and processor register access, bus operation, and other tools for direct and friendly access to specific hardware. These intrinsics may be supported by a compiler/linker or its emulation implemented using library functions or macro definitions. Intrinsics make programming for non-standard or application-specific hardware easy, comfortable, and very efficient. In the case of macro definitions and intrinsics, their specifications are also at a hand. Which PM is to be executed at which type of DP is assumed to be a priori unknown. This situation is realistic and practically representative because software and hardware parts of the systems are often developed by separate teams.
2. Hardware description (302 of FIGS. 3 and 4) of the multiplicity of distributed computer architecture to run given a PM on, i.e., all available DPs and their interconnections. This description covers all disposable features, including processor instruction set, internal and external buses, gates, ports, gateways, control registers, DMA channels, interfaces, etc. It can be given in the form of a standard hardware description language (HDL), e.g., Verilog-like description, VHDL, regular XML tags, etc. The necessary description is much less detailed than is usually needed for hardware development and verification. Such an aggregated description may look like the following (in human readable example language):

```
BUS_1:
{
width: { 128 bit; }
connects: { DP_1_VEC_MEM, DP_2_VEC_MEM,
DP_3_VEC_MEM, DP_4_VEC_MEM; }
transfers: {TRANSF_UNIDIRECTIONAL,
TRANSF_ASYNCHRONOUS};
programmable: { YES; }
mode: { bus master; }
configurable from: { DP_1, DP_2, DP_3, DP_4; }
DP address range: {
DP_1: VEC_MEM_LOW, VEC_MEM_HIGH;
DP_2: VEC_MEM_LOW, VEC_MEM_HIGH;
DP_3: VEC_MEM_LOW, VEC_MEM_HIGH;
DP_4: VEC_MEM_LOW, VEC_MEM_HIGH; }
port address range: { BUS_1_CTL_LOW, BUS_1_CTL_HIGH; }
}
```

The instruction set along with translation/compilation rules may be represented in much simpler form as in existing translators/compilers takes place, for example:

```
int + usigned: {iuadd}
int + int: {iadd}
unsigned << unsigned: {ushl}
int = int: {ld}
hash(int): {ueor, pop, push, iadd}
```

Apart from the interpreters/compilers, there is no need to specify registers, operands, or their placement and provide exact instruction sequence to compile a statement into. Only the list of needed instructions for a given DP is necessary. This allows using PMAA even without means to process source code into object code or simply run. The above-mentioned list of needed instructions can be realistically typed even manually by a DP hardware developer at the stage of hardware prototyping, when no software development tools are available. Thus, PMAA is already applicable at the very stage of separate software and hardware development to estimate their compatibility.

3. User-defined sets (306 and 308 of FIGS. 3 and 4) of input data. These sets can reflect typical/worst case sizes of input data arrays for the PM and are needed to solve the problem of DP applicability to run an actual PM. In the state of the art, such a data set is often called a use case. A use case description may be defined simply as a set of input data files in an application-specific format or an XML-like formal tag, or be written in a specialized format, such as:

```
use_case_1: {N=1024; M=16; low_index=1023; n_users=4096;
  n_antennas=16; delays[ ]=511:32:2048; }
use_case_2: {N=1024; M=12; low_index=127; n_users=2048;
  n_antennas=4; delays[ ]=11:24:8192; }
```

Output Information:
1. List of DPs that are suitable for running the PM. The list may be empty, which implies that the task is not solvable at all by means of a single DP in the framework of the given computational architecture. This output is parameterized by input data size and settings. That means that, if input data size is variable, the answer whether a given PM is applicable to a certain DP may depend on the input data size. This parameterization is reflected in the output of the analyzer. In order to help the analyzer find input data limitations for PM-to-DP applicability, some sets of characteristic use case input data can be provided by the user.
2. Call tree and PM entry point located (optional),
3. Sorted list of DP preferability for the given PM (optional),
4. Sorted list of applicable data transfer mechanisms for every massive (non-scalar) data exchange in the PM for every applicable DP (optional),
5. List of unreachable code parts (optional).

How PMAA Works:
The PMAA is provided with the whole of PM source code.
1. The PMAA analyses the project file (if available), parses the whole source code file-by-file, locates the starting (main) program module in the whole of source code, and finds its entry point. One difference from the prior art is the support of automatic entry point localization based on programming language syntax even without a project file. This is useful because the project file may have a closed, proprietary format.
2. The PMAA expands the call tree for a given PM and searches along all of the branches starting from the entry point (the root). If the source code contains a data-dependent call tree, its maximal possible version is located by assuming that all conditional calls (even mutually exclusive ones) are active simultaneously. That means that all possible calls are visited in the PM processing flow chart. For example, in the following code:

if (flag==TRUE && *a[i]*<0)*b[i]*=funct_1(*a[i]*);

the branch of calling funct_1 is supposed to be active even without knowing the exact values of the variables flag and a [i]. In the following code:

```
if (flag==TRUE && a[i]<0)
   b[i]=funct_1(a[i]);
else
   hash(a[i+1]);
``` both branches of the fork are supposed to be active for simplified instruction/intrinsic analysis even though that is impossible. In order to determine that every instruction is automatically converted from the original source code form to one or multiple instructions in the context of instruction sets of all candidate DPs, the PMAA performs tree traverse (for example, in depth or in width or some more complex way), follows instruction by instruction the computation algorithm, and checks whether programming language operators and intrinsics are allowed for this or that kind of DP. No actual object code generation occurs, apart from existing compiler techniques; this is done purely speculatively, to save time and complexity. This translation requires a DP hardware description which covers a DP instructions set. For example, if comparison instruction or hash intrinsic is absent in a DP inventory, the previous fragment of code appears to be not applicable to a given DP kind. Only the DPs that match the whole instruction and intrinsic set (if any) are left for the further analysis. Otherwise, the PMAA reports the possibility to run the PM on no processor in this architecture. Another difference from the prior art is the absence of non-necessary mapping of operands to exact memory places and processor registers, which makes analysis much faster; only sets of required and available instructions are compared so far.

3. Another goal is checking whether located DPs are capable to work with given use cases in the sense of data. For every use case, the maximal possible size of every data item is checked. Herewith, data type/size is tested vs. memory type/size for compatibility. In some highly efficient vector DPs, the memory is split into several types, e.g., scalar memory and vector memory. The first one is better suitable for short-word access, and the second one shows excellent performance at simultaneous reading/writing of long data sequences. Therefore, depending on data type, it can be placed to storage of one or both types. Further, memory of each type is split into several data banks which operate independently, to avoid latencies (so-called stalls) and enhance data throughput. Such features and related limitations (such as that an array could not be spread over two or more memory banks without programming workarounds) of memory subsystem architecture are reflected in the hardware description and are used to check whether placement of all data items is feasible for a given DP. For example, if a_length=1024 and st_sz=16, the following definitions lead to allocation of 4096 bytes for array a in scalar memory and 65536 bytes for pool b in vector memory:

```
unsigned a[a_length] at scalar_mem;
reserve_mem(b, st_sz*a_length, 4) at vector_mem;
``` assuming that size of (unsigned))=4 and the intrinsic reserve_mem(x, y, z) reserves y elements, z bytes each, for pool x. If the size of any kind of memory is not sufficient or there are addressing limitations, then the corresponding DP will be removed from the list of potentially applicable kernels of step 2. This feature is absolutely unique and is provided by no development means known. On the very early stage of parallel software and hardware development, it makes possible completely automatic estimation of hardware applicability to solve particular typical/worst case tasks (use cases).

4. The last, optional stage of applicability checking is verifying whether all necessary "infrastructure" hardware for running the PM is provided by each remaining DP. All the reachable branches of the source code (see the step 2) are inspected for data value assignments and transfers using operators and intrinsics. Both explicit and implicit data modifications and moving are taken into the scope:

```
a+=(b>>=c);
DMA_save(DMA_CHANNEL_1, DMA_MODE_AUTO, &a, sz_a);
*(a+k)=b+i;
data_load(a,MAIN_MEMORY,b,EXT_MEMORY,sz_a);
```

The PMAA determines:
(a) whether there exist hardware means to fulfill these operations,
(b) whether found hardware is applicable for operations with these data and memory types, and
(c) whether the estimation of the maximum total data size needed for the task (i.e., input, output, and internal data used by the task) doesn't exceed the DP memory size.

This estimation takes into account the memory types needed for the specific data (see the example with vector and scalar memory above) and the data transfer requirements. For example, the widely used "double buffering" technique (where the input data for the next task is transferred to the $2^{nd}$ memory page while the DP is working on the previous task, processing the data stored on the $1^{st}$ memory page) doubles the memory requirements for the input and output data storing. If some of the remaining DPs are incapable of performing these data storing/exchanges, then they are excluded from the list of suitable DPs.

Optional Outputs of this Step Include:
(a) whether unreachable source code branches are found, where this is reported to the user in the form of warnings or errors,
(b) if multiple transfer mechanisms are available for some specific transfer, then they are sorted by their speed and later used as an input for the CAS/CA and Interconnection Optimizer, described below. This stage again differs from known state of the art techniques because it provides checking without code generation and looks for all possible hardware data paths instead of implementing one,
(c) checking whether the compiled task code fits into the DP instruction set memory. This step is optional because the PMMA has the approximate estimation of the compiled code, and the precise check will be done later by the compiler anyway, and
(d) if the information about the average transfer size is available for the task input/output data, and this estimation exceeds the bus capacity, then this DP is not suitable for this task. This step is optional because, even if this check is not performed by the PMAA, the final schedule will take into account the information about the average expected transfer sizes anyway.

The PMAA determines whether a processor can run a program module without compiling the program module. The PMAA performs the following operations, some of which are permutable:
a) The PMAA looks through make file(s) and/or other kinds of project files in order to gather file dependencies (namely, which file is included in which, which files will be linked together, function calling graph) and gets a call graph from the Dependency Analyzer or independently.
b) For every pair {PM, DP}, based on the information retrieved in the step a), the PMAA analyzes directives, macros, and intrinsics found in the whole bunch of source code to answer the question: Which PM could be run on which breed of DP in the scope of instructions it uses. Indeed, if a PM calls either an instruction or an instruction sequence not supported/allowed by a DP, then there is sufficient reason to exclude the PM from the list of applicability for the given DP (and vice versa). This analysis can be performed in linear time on the number of DPs and the number of PMs. Typically, the PMAA will reject very many pairs {PM, DP} from an initial comprehensive list. That is why it looks good as the first compatibility seed in the SIET tools.
c) If the list of applicable DPs for a PM is empty, then the PMAA reports complete failure because the architecture is not sufficient for the task (lack of computational basis).
d) If the list of applicable PMs for a DP is empty, then this DP will be idle throughout the processing, and the PMAA reports a warning because the architecture is not optimal for the task.

Based on a simple architecture description and a set of use cases prepared by the system engineer as well as on the dependency graph obtained from the Dependency Analyzer for a given pair of {PM, DP}, for the first PM in the computation chain, the PMAA estimates the size for each input/intermediate/output data object (e.g., array, structure, memory pool). This estimation could be done entirely based on source code analysis because the source code explicitly contains dependencies of memory size on input data size. If the situation of exceeding available memory room is detected, the situation is recorded as a limitation for the pair {PM, DP}. Thus another amount of pairs {PM, DP} can be excluded from further processing, as in steps c) and d). The same is easily achieved for every consequent PM in the computation chain because the size of its input data is deduced from the size of the preceding steps' outputs which are already at a hand. As one result, the matrix of DP vs. PM is made sparse, which facilitates further applicability and cycle analysis in the Cycle Analyzer and the Data Exchange Analyzer.

Cycle Accurate Simulator (CAS) and Cycle Analyzer (CA)

In general, the cycle accurate simulator (CAS) and the cycle analyzer (CA) provide similar functionality but by different approaches. The purpose of both the CAS and the CA is to build dependencies of total PM execution time versus all input data item sizes for given use cases. This information plays a key role for further aggregated timing analysis of different PM-to-DP mappings. This subsequent timing analysis is used for schedule optimization and creation of schedule templates.

Input Information:
1. Source code, the same as the PMAA. Call tree and PM entry point (if provided by the PMAA or externally) are also useful.
2. Hardware description, which reflects different aspects of hardware than for the PMAA. In the case of the CAS/CA, the hardware description maps operators/instructions/intrinsics names to their execution time. It is known that, for most processor instructions, their execution time does not depend on exact operand data and preceding instructions (such as add, ushr instructions). On the other hand, memory access and function calling/return instructions are often situation-sensitive. For example, the instruction:

uld memory_address, register_name may require additional processor cycles if the same dynamic memory bank was accessed shortly before, because such memory takes some processor cycles for read/write operations, and thus additional processor lags (so called stalls) are inserted for proper operation. A similar situation arises with the ret instruction of return from a function call because it sometimes has to do something with stack pointer and processor registers and sometimes not. A sample description of instruction cycles may be done in the following way:

```
{mul: 1}
{mul64: 5}
{uld: if_preceeded(uld, ild) 4 else 2}
```

3. The set of use cases is normally the same as for the PMAA, but can be extended/truncated if necessary.

Output Information:

The CAS/CA provides estimates of partial and throughout PM execution time on every admissible DP as a multivariate function of all variable input data items in the set of use cases. This resulting function can be provided in the form of a table, plot, or analytical approximation. Being a kind of a profiler, the CAS/CA follows an algorithm specified in the source code and automatically analyzes cycle counts needed to perform data flow inside a given PM. Memory latencies and stalls and processor sub-block wait states are respected. It is clear that, for a PM, the CAS/CA should be run as many times as applicable DPs are found by the PMAA. For a given DP, the CAS/CA provides both detailed and summarized cycle counts. If these are dependent on input data of this PM, then, as with the PMAA, the CAS/CA outputs are parameterized. That is, the CAS/CA builds dependence of DP cycles vs. input data size and parameter values. If the algorithm is very complex and/or it has indeterministic behavior, minimal/maximal time estimates are provided. Sets of use cases help to estimate the computation burden. If dependencies are too complex, then they are approximated (upper and lower boundaries). Thus, the analyzer exceeds the functionality of a general profiler because a) it returns time dependences vs. data size, not single numbers, and b) output comes in more details because timings for every PM algorithm step are retrieved.

How CAS Works:

The CAS implements the following method for PM runtime estimation:
1. Based on PM source code and hardware cycling information, the CAS creates a black-box timing model of a PM for every given use case. This can be done in two alternative ways:
    a) For input data from a use case, the CAS follows the computation algorithm and determines which branches will be chosen for the use case. In order to do that, all expressions in conditional operators are estimated during code parsing and interpretation under the selected input data. Apart from the usual state of the art interpretation, there is no need to evaluate all other expressions and perform actual computations. The CAS follows the algorithm in a given particular use case and substitutes each source code piece (operator, macro, intrinsic) with its equivalent run time, expressed usually in terms of number of DP cycle counts. The CAS remembers in its output all partial delays and sums up all these latencies, thus getting the total run time of the PM at the DP for the selected use case.
    b) The PM source code is compiled/interpreted in stepwise mode (like break points in a debugger) and then is run at a clock-accurate simulator with the selected use case input data. The simulator tells the amounts of needed cycle count, which are remembered.
2. This procedure is repeated as many times as the number of use cases for every allowable PM+DP pair available as the PMAA output.

3. All obtained timings for every PM+DP pair are joined together to represent complexity dependence on input data size. For the sake of compactness and usability, the complexity function may be approximated (to obtain upper bound, lower bound, medium estimate) using one or other simple mathematical model, e.g., multivariate polynomial of low degree or polygonal surface. This multivariate complexity model is a major result of CAS/CA stage.

How CA Works:

The CA embodies a much more refined and complex approach than the CAS.
1. An intellectual parser follows the source code and localizes the following structures:
    a) Linear (sequential) code. Its complexity is the sum of partial instruction cycles (taking into account the above-mentioned dependable wait states and stalls);
    b) Branches (forks). Their complexity might be represented by lower and upper and medium estimates of the branches. Known means of interval arithmetic make these minimal and maximal time computations more abstract and mistake proof;
    c) Loops. A lower complexity boundary is given by multiplication of lower count of loop runs by lower complexity of a single loop pass. An upper complexity boundary is the product of maximal loop count by maximal single loop pass cycle count. Definition of mean complexity may be different.

Every such a block is referred to subsequently as a code macroblock.
2. For a single operator and the whole code macroblock, their cycle counts are represented as functions of input data size (not the actual data but its size). For example, the total cycle count for the following code macroblock:

```
a[N];
...
for (i=1;i<N;i++)
{
while (a[i]<threshold) { counter++; threshold*=delta; }
}
```

Let:
a) The complexity of the nested loop body {counter++; threshold*=delta;} equal 4 cycles;
b) The complexity of the nested loop frame while ( ) { } equal 2+10*while_repetitions cycles;
c) The complexity of the nested loop condition a[i]<threshold equal 5 cycles; and
d) The complexity of the enclosing loop frame equal 4+11*N cycles.

Thus, by means of simple symbolic computations (which belong to the state of the art), the total complexity is:

$$4+11*N*(2+10*\text{while\_repetitions}*(5+4)+5).$$

By knowing from the source code analysis that max(while_repetitions)=N and min(while_repetitions)=0, we obtain an analytic complexity estimation as the function of input data size N. If such dependence appears to be too complex, then it is approximated/bounded using simpler mathematical expressions.
3. Cycle counts for all code macroblocks are joined together (branching choice is taken into account using low/upper bound and mean estimates). As a result, a complete analytical description of PM complexity on a given DP is achieved.

The major difference of all suggested CAS/CA procedures from known code analyzers and profilers is that the former automate building the whole view of PM complexity dependence as a function of multivariate input data size and are capable of providing analytic estimates instead of a huge amount of numbers. This can be done (e.g., the CA and the first implementation of the CAS) even without creating and running executable code of the PM for the sake of development resources. The CA approach provides no PM execution at all, substituting it through deep code inspection and analysis using symbolic computations. Another difference is detailed operator-wise cycle count output which allows for a completely unusual and more efficient scheduling routine in SBT.

Dependency Analyzer (DA)

The dependency analyzer (DA) traces data dependencies in the source code, starting from every PM input data item towards every PM output data item (any to any). In particular, if no dependence exists between an input item and an output item, then this fact is remembered as well. For every data dependency, partial and thorough time delays (both in terms of DP cycles) are estimated. This estimation becomes fairly easy by means of CAS/CA output usage. Indeed, the DA follows all operators/instructions leading from a selected input data item towards a selected output data item and sums up the corresponding delays provided by the CAS/CA. If branching occurs, then minimal, maximal and mean estimations are taken. The latest time for providing secure input (LTPSI) and the earliest time for secure output readiness (ETSOR) are computed. Later, in the schedule building tools (SBTs), this serves as one of the most important information items for fine schedule optimization.

Input Information:
1. The same PM source code as for the PMAA and the CAS/CA;
2. The list of cycle counts for PM+DP pairs from the CAS/CA; and
3. The set of use cases (optional).

Output Information:
1. A complete list of dependencies in the PM available from the CAS/CA; and
2. Complete timing information for data item dependencies.

How the DA Works:
1. The DA traces dependencies between all particular inputs and outputs of a PM running at a particular DP, for example, in the following source code fragment describing a function:

```
int normalize (short gamma, short threshold, int *a, int *b,
unsigned M, unsigned N)
{
label__0:
unsigned i;
label__1:
for (i=0; i<N; i++) b[i]*=gamma;
label__2:
for (i=M; i>=0; i--) a[i]=a[i]>threshold ? a[i] : threshold;
label__3:
return 0;
label__4:
}
```

The following table provides an extended dependency description:

| Variable Name | Must be allocated before | Must be initialized before | Is not used (read/written) after (i.e., can be freed (erased)) | Is not changed (written) after (i.e., can be transferred to other PMs/DPs) |
|---|---|---|---|---|
| i | label__1: | — | label__3: | label__3: |
| N | label__1: | label__1: | label__2: | label__0: |
| M | label__2: | label__2: | label__3: | label__0: |
| gamma | label__1: | label__1: | label__2: | label__0: |
| threshold | label__2: | label__2: | label__3: | label__0: |
| b | label__1: | label__1: | — | label__2: |
| a | label__2: | label__2: | — | label__3: |

Knowing cycle counts between the steps, e.g.:

| Program Stages | Cycle Count Between Program Stages (Certain Numbers) |
|---|---|
| Calling normalize to label__0 | N1 |
| label__0: to label__1: | N2 |
| label__1: to label__2: | N3 |
| label__2: to label__3: | N4 |
| label__3: to label__4: (i.e., return from the function) | N5 |

The desired LTPSI (maximal number of DP cycles the variable must be ready for use after calling function normalize) and ETSOR (minimal number of DP cycles the variable must be still retained after calling function normaliz e) are determined:

| Variable Name | LTPSI | ETSOR |
|---|---|---|
| I | not destined for input as an internal variable | not destined for output as an internal variable |
| N | N1 + N2 | not destined for output as an input variable |
| M | N1 + N2 + N3 | not destined for output as an input variable |
| Gamma | N1 + N2 | not destined for output as an input variable |
| Threshold | N1 + N2 + N3 | not destined for output as an input variable |
| B | N1 + N2 | N1 + N2 + N3 |
| A | N1 + N2 + N3 | N1 + N2 + N3 + N4 |

It results from the last table that N and gamma must be available at the latest after N1+N2 cycles after normalize entry, M and threshold at the latest after N1+N2+N3 cycles, and there is no need to transfer any of them elsewhere afterwards. On the other hand, a and b can be provided not simultaneously but consequently (saves time using transfer parallelization) and can be saved for further computation as well consequentially: first b, after N1+N2+N3 cycles, then a, after N1+N2+N3+N4 cycles. In existing state-of-the-art systems, both arrays are required before calling normalize and understood as ready for transfer at the earliest after return from the function, i.e., N1+N2+N3+N4+N5 cycles, so the gain from transfer parallelization in the present approach is evident.

2. In the following way, the DA processes particular dependencies between data items exchanged by different PMs, and finally from each input of the complete software system to each output. The DA can apply cycle counts available from the CAS/CA. That means that the DA generates information on how soon a certain output data block will be ready after all necessary input data blocks are supplied and the list of all involved data items. The result specifies the latest endings of all internal and external input data transfers and the earliest beginnings of all internal and external output data transfers for all of the PMs already bound to certain DPs. This information can be represented in absolute and in relative form. Absolute delays are useful for global system scheduling, and relative delays are needed later to build synchronization events and implement fine-grain scheduling of certain PMs.

Data Exchange Analyzer (DEA)

Based on data supplied by the CAS/CA and the DA and on knowledge of the hardware, the data exchange analyzer (DEA) maps data transfers on available hardware means for data exchange. The DEA does not perform scheduling of data passing but just collects necessary information and binds DP+PM pairs to available means of conducting data transfers. Exact methods of providing every particular transfer are not fixed yet, if multiple choices are available.

Input Information:
1. Dependencies along with bound cycle counts from the CAS/CA and the DA;
2. Hardware description serving mainly the purpose of determining and analyzing all data interchange devices involved;
3. PMAA output concerning memory usage for use cases; and
4. PM source code.

Output Information:
The DPs bound to all possible data exchange hardware devices to perform data transfers collected by the DA. Time consumption is estimated for every data exchange using every applicable mechanism.

How the DEA Works:
The DA supplies a comprehensive list of data transfers in the system along with their timing limitations. Until now, all elementary data exchanges are abstract, i.e., they exist apart from actual hardware features and limitations. The DEA performs the following steps:
1. For every transfer, the DEA analyzes data types, corresponding memory locations (in local, cluster, and external address space), and storage types in order to find multiple mechanisms of data transmission between DPs. For example, if an array c resides in vector memory in a source DP and is expected to be moved to scalar memory of a destination DP, then an existing DMA engine might be incapable of handling this combination of incompatible memory types, and therefore other means are looked for. One of the ways to perform the transfer is to place c first to the cluster shared memory and then to the destination memory, but this operation can cost much time (because external memory is normally very slow compared to the internal memory of a DP) and this way it blocks the bus for a considerable duration. A suitable alternative is introducing a transitional array in local vector memory of the destination DP and putting the data there first, and then by means of the destination DP (which is assumed to be idle by that time) to move it to its ultimate place. Another solution is mirrored: a temporary transient array is created in scalar storage of the source DP, and the first hop of data moving is done by means of the source DP. All these possibilities are remembered for the next stage of the DEA. Only if some possibilities are in any way worse than other ones, they are rejected. For example, using the global bus for data exchanges inside the same cluster has no advantages anyway. If a transfer could not be mapped to at least one hardware-based mechanism, then an error report is produced because the given architecture is inapplicable to the given task.
2. PM timing from the CAS/CA and the DA enables estimation of the exact times of data item readiness and availability. There can arise a situation that the source DP "wants to get rid" of a data item as soon as possible in order to perform the next task. On the other hand, memory at the destination DP is, for a long time, not ready to accept the data. A temporary storage is needed. There exist four alternatives:
    a) As a temporary storage, spare area of memory at either the source or destination DP is used, where no additional memory transfer is required. This is the most desirable solution. To make sure that this is possible, the DEA looks through the PMAA output and tries to find enough compatible memory. If successful, then the source code is automatically changed to orthogonalize data storages: either the address range of the output array for a given PM or the address range of an input array is changed;
    b) As a temporary storage, spare area of memory at either the source or destination DP is used, where an additional memory transfer is needed. The DEA looks through the PMAA output and tries to find enough compatible memory. There is less restriction compared to solution a) because "compatibility" is more loose as it does not necessarily meet memory types exactly but solely to make intermediate data transfer possible (see example with array c in the step 1 above);
    c) Another idle DP (in the same cluster for the sake of global bus load) can accept the data array for a while. The DEA looks for such DPs having compatible memory types and less potentially loaded with compatible PMs; and
    d) Using temporary storage in slow external memory (as mentioned above, it has its disadvantages) but can serve as the last resort.

Assume that array d should be located in vector memory both in the source and destination DPs situated in the same cluster. Then a local DMA engine can be used as well as transfer by means of DPs involved. The problem is that, according to estimated timings from the DA, there is a huge time gap between when d is ready at the source DP and when d is engaged in processing at the destination DP where memory is completely loaded with other data at the moment. In this case, only solutions c) and d) are suitable.
3. For all possible implementable transfers found in steps 1 and 2 of the DEA, time cycle counts are computed. It is possible because hardware timings and data array sizes are known. Both alternative transfers and their timings are saved in the output of the DEA.

Schedule Building Tools (SBTs)

Like the SIET tools, the schedule building tools (SBTs) are intended for off-line execution on a powerful computer. Based on the multiplicity of outputs from the SIETs, the SBTs create a template for (sub)optimal schedule or a set of characteristic schedules. Apart from known approaches, the result is not necessary a fixed ready schedule. The result includes:
1. Mainly, automatically generated source code of relatively small additional RPM modules which are to be bound to APMs of particular DPs. These tiny RTE modules provide twofold functionality: a) local synchronization and b) mostly local data transfers. Synchronization events are reduced to a minimum and cover only a few bound modules each. Moreover, deep source code and cycle analysis in the SIETs allow avoiding superfluous synchronization if one event necessarily happens before another. Being minimalist and supremely decentralized, these tiny RPMs provide all necessary means to perform a complete task for any foreseen set of input data and settings. Thus, no additional adaptive scheduling and arbitration are needed while running on the fly. For example, after array C is ready, the PM at the first DP should start its transfer to the second DP. A few lines of RPM are automatically inserted into the APM at the first DP to kick it off without means of synchronization because the second DP will necessarily be at this moment idle. As data block D is ready and APM at the first DP is finished, another few source code lines of RPM are used, setting up a synchronization object for this transfer to the third DP.

2. Additionally, automatically derived data for fast profiling and system analysis. One can estimate timing for arbitrary input data, parameters, and setting based solely on SIET results without multiple calls of a general profiler.

The secondary, algorithmic simulation stage 330 involves one or more of the following SBTs:
Interconnection Optimizer (IO);
Schedule Builder (SB);
Synchronization Optimizer (SO);
Source Code Generator (SCG); and
Profiling and Modeling Code Generator (PMCG).

Interconnection Optimizer (IO)

The interconnection optimizer (IO) ranges output of the data exchange analyzer in order to find the best data transfer model for a DP. It operates globally and takes into account the fact that, in distributed multiprocessor systems, for the sake of speed and simplicity, there is little memory access protection. That means that a data transfer of a ready data block can be started even before the corresponding provider APM is finished. Such a technique is not feasible in "hand programming," because it requires a precise cycle count. On the other hand, the present technique allows "transfer orthogonalization," where data blocks are moved as soon as:
a) the data blocks are ready,
b) the destination memory is available, and
c) the hardware assigned to perform the transfer is also ready.

The interconnection optimizer narrows the possible choices of APM-to-DP assignment.

Schedule Builder (SB)

The schedule builder makes hard or soft assignments of APMs to DPs to minimize either total computation time at given resources or resources for a given maximal time. In both cases, the SB looks for critical path candidates in a dataflow diagram supplied from the SIETs and provides APMs assignment optimization. This is more than usual scheduling because assignment is, in a general case, a function of input data and parameters and takes into account known cycle dependences on the inputs for critical APM+RPM+DP combinations. In order to distinguish this from a completely predetermined schedule we call this "a schedule template." Every schedule template is a number of relatively simple, hard-coded rules that determine which PM=APM+RPM starts which on what event. Events include elementary data transmissions. For example, a given PM can be executed by Streaming Processor (SP) No. 6, Vector Processor (VP) No. 1, and VP No. 3. Although the SP is a bit faster with this piece of code, the PM will be assigned to another, more profitable PM.

VP No. 3 provides worse output data transfer facility than VP No. 1, so VP No. 1 is bound to the PM.

Synchronization Optimizer (SO)

For one or more better schedule solutions joined into a schedule template, the synchronization optimizer develops a synchronization scheme. The synchronization scheme is supported via a) direct calls of one PM from another and b) synchronization objects (semaphore, mutex, critical section, volatile memory area, interrupt request and handler, and others). Which synchronization mechanism will be chosen, if any, depends on the dataflow and hardware features available to minimize overhead.

Source Code Generator (SCG)

The task of the source code generator is twofold: a) RPM generation and b) black box simulation APMs generation.

Firstly, based on the output of IO, SB, and SO, the SCG generates RPMs source code in Assembly or in a high-level programming language for every PM that needs it. These small, ad hoc modules provide minimal necessary functionality to implement a schedule template, synchronization, and data transmissions. Thus, in the aggregate, the RPMs can be viewed as an automatically generated, ad hoc optimized, minimalist real time environment. These RPMs are capable of:

a) Based on given input data and using relatively simple rules, making decision as to which schedule template to select;
b) Carrying out the schedule template;
c) Diagnosing statistically very improbable deviations from the selected template, e.g., with non-standard input data provided unpredicted PM behavior and related changes of latency;
d) Switching between templates if needed. Option: a special worst-case schedule template can be foreseen. If factual latencies do not fall under any of the ready templates, the SCG can be used to guarantee proper data flow and synchronization at additional cost of safety synchronization.
e) Option alternative to one in d): dropping current task if it could not be accomplished on time, and become ready for the next task.

Main applications of the present approach are viewed in computation-intensive queueing real time systems, such as cellular telephony base stations, deep network packet processing, and on-the-fly digital video transmission and processing. In systems of this kind, the inability to finish processing of a data block (say, packet) on time almost always leads to its dropping in order to manage processing of other blocks on time. The non-zero probability of packet loss events is normal in these systems. In order to minimize this probability and additionally raise schedule quality, it is important to provide the SIETs with sufficient and representative use cases. If there is no a priori information concerning which use cases are good enough for schedule optimization, then this process can be made iterative:

a) Start with use cases that were forwarded to the SIETs,
b) SBT provides wrapper source code based on the use cases,
c) The system as a whole is compiled, linked, executed, and thoroughly tested with a wider set of use cases,
d) Built-in packet-dropping analysis delivers information concerning which use cases are more critical, and these are included into the SIET input,
e) Return to b) until a satisfactory use case set is formed.

Secondly, the source code generator produces "fake" APM source code for black box time accurate simulation. That means that, for every APM, its dummy counterpart is generated. A dummy counterpart performs no actual data processing, but just computes its cycle counts and adds them up to estimate overall system timings. The functionality of the source code generator is completely new.

Another distinction from known scheduling concepts is that the whole RTE code-containing schedule is synthesized by the SCG a priori. This allows the RTE code to be written to firmware nonvolatile ROM memory and still enjoy low-price, nearly optimal dynamic scheduling. The scheduling is dynamic because template selection and application are performed online The SCG uses the following scheduling information for the RTE source code generation:
 a) Task-to-processor assignment;
 b) Task dependencies—for each task, the list of other tasks that use its outputs as their inputs;
 c) Maximum DP memory used for all the tasks assigned to this DP, taking into account data transfer requirements, like double-buffering;
 d) Maximum number of tasks that can be delayed at each DP; and
 e) Maximum number of data transfers that can be delayed at each DP.

Consider the functionality of SCG (Source Code Generator) module using a practically important example.

Every line of the following Tables I and II embodies a single elementary step from input data towards output data. It is important that both calls of PM API functions and data exchanges are coded and performed in a well-granulated, uniform way. The degree of computation granularity is set by the amount of operations in a quantum function call, such as init, get_resources, proc.

ones', hexadecimal FFFFFFFF, in given implementation; it serves as a simplified handy reference to the previous step only. Thus, arbitrary dependencies from the preceding 31 steps (in described sample implementation; there are no general limitations) can be coded easily and in the most compact way. The formal set of data dependencies was previously made thin based on extended cycle analysis in SIET. Therefore, only dependencies absolutely necessary to check are retained here. The limitation of dependency depth (here 31 steps) limits neither processing flexibility nor complexity of computation graph as a whole. Indeed, an arbitrary computationally rich and highly branched algorithm can be decomposed into smaller parts (each can be represented with such a table). On the other hand, modern real-time algorithms for data stream processing are very seldom highly branched. If it is the case, techniques of speculative execution well known in the state of the art can be used.

The second field type and the third field proc are joined together into another processor word. The field type provides PM instruction (higher 4 bits) and library number (lower 4 bits). For example, D0 (hexadecimal) means data transfer for 0th library, 10 (hexadecimal) is init function of 0th library, 20 (hexadecimal) is get_resources function of 0th library, 30 (hexadecimal) denotes run function of 0th library. The field proc tells DP instance to run given PM instruction on.

The fourth field end is the message to send to the host processor (or control processor, depending on the architecture) after the call is performed and ended. Zero serves as the marker of no message notification. The message plays a twofold role: a) it notifies the central control entity on the readiness of output data, and b) it provides diagnostics message if error/warning occurs. It is important to mention that the message can, like the dependency marker depend, be a concat-

TABLE I

| Depend | type | proc | end | size | trans_dst | | trans_addr |
|---|---|---|---|---|---|---|---|
| 0 | 10 | 3 | 0 | 4 | 0 | 05 | 13F0 |
| FFFFFFFF | D0 | 3 | 0 | 16 | 0 | 14 | 1300 |
| FFFFFFFF | D0 | 3 | 0 | 16 | 1 | 14 | 1310 |
| 7 | 20 | 3 | 0 | 11 | 0 | 0 | 0 |
| FFFFFFFF | 30 | 3 | 0 | 22 | 0 | 0 | 0 |
| FFFFFFFF | D0 | 3 | 0 | 16 | 2 | 41 | 1320 |
| 0 | 10 | 5 | 0 | 4 | 0 | 05 | 15F0 |
| FFFFFFFF | D0 | 5 | 0 | 16 | 0 | 14 | 1500 |
| FFFFFFFF | D0 | 5 | 0 | 16 | 1 | 14 | 1510 |
| 1C0 | 20 | 5 | 0 | 11 | 0 | 0 | 0 |
| FFFFFFFF | 30 | 5 | 0 | 22 | 0 | 0 | 0 |
| FFFFFFFF | D0 | 5 | 0 | 16 | 2 | 41 | 1520 |
| 0 | 0 | 0 | FFFFFFFD | 0 | 0 | 0 | 0 |

TABLE II

| Depend | type | proc | end | size | trans_dst | | trans_addr |
|---|---|---|---|---|---|---|---|
| 0 | 10 | 1 | 0 | 4 | 0 | 03 | 11F0 |
| FFFFFFFF | D0 | 1 | 0 | 16 | 0 | 12 | 1100 |
| FFFFFFFF | D0 | 1 | 0 | 16 | 1 | 12 | 1110 |
| 7 | 20 | 1 | 0 | 13 | 0 | 0 | 0 |
| FFFFFFFF | 30 | 1 | 0 | 26 | 0 | 0 | 0 |
| FFFFFFFF | D0 | 1 | 0 | 48 | 0 | 21 | 1100 |
| 0 | 0 | 0 | FFFFFFFD | 0 | 0 | 0 | 0 |

The first field (table column) depend consists of a single 32-bit processor word and comprises dependencies on results of previous steps: binary 1 in the k-th position (counting digits from right to the left like in decimal numbers) marks existence of dependence on k-th computation step; binary 0 denotes absence of such dependence. A special case is 'all enation of binary flags. For example, each flag can correspond to an output data piece, saying whether it was computed correctly or not.

The fifth field size provides: a) the amount of bytes to exchange between DPs for a data transfer transaction, and b) the estimated number of cycles for the called PM. The latter can be helpful for the fine-granulated on-line part of scheduling to estimate function running time.

The last concatenated pair of fields, the sixth field trans_dst and the seventh field trans_addr, relate to the destination memory. Memory buffer numbers (0, 1, 2, ... ) available to the library are given by the high byte in trans_dst, memory types are coded by the low byte in trans_dst, and trans_addr sets the destination address (two bytes) in a given implementation.

Each table represents a complete chart. Table I concerns DPs No. 3 and 5, and Table II engages DP No. 1. After a chart is completely performed, the control software loads the next one, and so on. This chart segmentation saves very valuable memory and, on the other hand, provides more flexibility in processing resource assignment.

Each step (node) in a described flow chart (i.e., row in the tables above) is loaded into a program structure. In one implementation, its incarnation in C programming language is shown as follows:

```
typedef struct rte_computation_chart_node_s
{
    i32 dependencies; /* bit i is 1 if the task depends on task #i */
    i32 message; /* message */
    u16 size; /* task duration/transfer size in bytes */
    u8 lib_buf_no; /* buffer number inside the lib_data array */
    u8 mem_types; /* memory types for data transfers */
    i32 mem_addr; /* system/another cell memory address */
} rte_computation_chart_node_t;
```

An array of uniform structures of this kind represents the whole table. The fields reference table columns.

In a given example, SCG analyzes a complete set of charts and integrates this sparse information in source code in the following compact way:

Firstly, since SCG knows the head control processor that starts the whole computation, SCG generates a kind of "bootstrap" to load an RTE kernel to the host and control processors and APM+RPM to every DP engaged and to configure the initial state of processors properly.

Then SCG parses the table of the chart to locate if at least one event in the future depends on a given chart step.

If this is the case, then SCG encapsulates, in dependent source code of RPM, a synchronization object waiting for this event, e.g., using a hardware-supported semaphore, as follows:

```
semaphore s_1=0;
...
run_pm_1( ); kick_semaphore(&s_1); /* notify all dependent RPMs
that the step of running run_pm_1( ) ended */
``` or using global volatile memory, as follows:

```
u32 events1=0, event_mask_1=0x0008;
...
run_pm1( ); events1|=mask1; /* notify all dependent RPMs that the
step of running run_pm1( ) ended */
``` or using message passing, as follows:

```
    send_message (MSG_PROCESSING_1_DONE);
```

In the source code of every dependent PM, SCG inserts operator of waiting for this event. SCG inserts the code providing loading of flow chart table into RPM. This code is normally run on a host/control processor as it guides local scheduling and is, in a given sample implementation, message-driven. The host or control processor receives and analyzes the message (end) sent by DP and loads there the next table according to current state. In other implementations, the function of table loading can be delegated to the DP. The latter embodies a more decentralized model but it takes more resources at the DP. SCG creates an RPM loop which puts through the chart graph locally. This part of source code is generated automatically based on a template and implements minimal possible RTE functionality. In a given implementation, it is done in a uniform way. This means that RPM receives control from either a host/control processor (on table start) or from a previously locally executed PM function, then starts the node processing loop. The loop checks whether all prerequisites for the next node starting are satisfied, and, if so, decodes and runs it. This processing is repeated until the end of the loaded table. The set of consequently loaded chart tables embodies a template for a (sub)optimal schedule or a set of characteristic schedules.

Another task of SCG is black box simulation. Indeed, SCG is the entity dealing with localized and instantiated schedule embodiment. To perform black box simulation, instead of running APM functions, RPM simulates waiting for size cycles taken from the chart table. This allows time-thrifty use case simulation almost without source code change. Being asked to produce source code for black box simulation, SCG just automatically substitutes calls of APM functions for their cycle counting equivalents. This can be done easily because all necessary information already sits in the chart table.

Profiling and Modeling Code Generator (PMCG)

The profiling and modeling code generator creates standard high-level programming language source code (for example, ANSI C) for the whole computation framework to be run and modeled using standard computers. Additionally, the PMCG enables fast and flexible profiling to reflect resource dependence (firstly, processor cycles and memory usage) as a function of input parameters (data and configuration) for the system as a whole and its parts.

Distributed Data-Driven Scheduling Conception

In real-time heterogeneous multiprocessor systems described herein, static off-line scheduling is not applicable because:

Input data size varies greatly, making a single precomputed schedule non-optimal, and A precomputed set of all needed schedules would be too capacious to store in memory and would need centralized scheduling, which is inefficient in such systems.

On the other hand, pure dynamic scheduling:

Takes too much computational resources, and

In order to find a good schedule, introduces considerable latency that is intolerable in on-the-fly processing.

The real-time environment (RTE) is not a set of standard, general-case features of an operating system that supports the functionality of APMs. That type of RTE, consisting of standard modules, is usually not optimal to solve special narrow sets of tasks. Rather, the RTE should be maximally adjusted for specific tasks performed using APMs. Such an ad hoc RTE can be either written manually (which takes too many man hours) or generated automatically for a given, rather narrow set of tasks by means of SIETs and SBTs. The suggested approach solves the problem by providing efficient techniques of joint optimization of the RTE and the APMs. These techniques involve both PM mutual synchronization and data exchange.

In order to keep the RTE code and its resource demands as small as possible on one hand and to support a very complex (without theoretical limitations), data interchange and synchronization model on the other hand, a maximally decentralized framework is suggested, which uses known means of both hardware and software to reach the goal of PM interaction in a new way.

Consider a set of heterogeneous DPs and a multiplicity of PMs assigned to them in order to perform massive computations in real time. There are many input data blocks (and settings) supplied to either the same or different PMs and multiple output data blocks taken from one or more PMs. In the midstream, PMs perform intensive data exchange according to an a priori known data flow chart. On the other hand, the exact times of every intermediate or output data item readiness are, in the general case, unknown. To assure correct and highly efficient data flow, some means of PM synchronization are needed. Mixed-mode data transfers are proposed, to follow an optimized schedule.

Case (a): if a PM has performed a corresponding part of some computation and further on is supposed to be idle for some time. An extension of this case is the situation of a PM having another job to do, but this next job does not belong to the critical path and is not a candidate to the critical path. Thus, this PM can accomplish its output data transfer to one or multiple destination PMs using a bus if the corresponding destination memory areas are available at the moment. Note that, in many real-time systems, there is no protection against side memory write access. This fact is used here. Note further that considered here is the case of separate buses for DMA exchange and inter-processor interaction by means of DPs. If both use the same bus, then this case is reduced to Case (c) below.

Case (b): if a first PM is waiting for its input data which is, at the moment, already available at some other PM, then the first PM can read the data from other PM using a bus, as soon as this block of data is ready and available remotely. Again, the facts of memory availability to the other PM running on another DP and availability of separated buses are exploited.

Case (c): in all other cases, data transfers are conducted via direct memory access (DMA) hardware. This is the major way to perform data exchange. DMA hardware may comprise a single DMA channel or multiple, independent DMA channels.

The cases (a) and (b) can be merged into a more general framework as follows:

1. A PM has to perform the i-th task. To do that, the PM needs a distinct amount of input data, some of which may already be available at other DPs, while others might not yet be ready at other DPs. In order to start the i-th task, this PM has first either to load these blocks of input data from other DPs or to wait until some of the other DPs (assigned to perform the transfers) finish the transfers. Which way of input data retrieval is chosen, depends on the schedule template embedded into the executable code of PMs and the states of synchronization objects.
2. In addition, in order to perform the i-th task, this PM needs a known amount of free operational RAM to store: a) intermediate/temporary data in the course of computations and b) output data of the i-th step.
3. Moreover, this PM has to perform by itself (or wait to be performed by another PM) moving of the output data left in the memory of this DP that was left from the previous steps. This task can be urgent or not, depending on the dataflow chart put into the schedule template.
4. If at least one of the conditions mentioned in 1 and 2 is not satisfied, then starting the i-th task is impossible. If so, then the whole amount of data transfers to be done is split into two sets: a) urgent data transfers and b) postponable data transfers (that can be delayed at least until the next task (i.e., the (i+1)-th task)). Excluded from the list of urgent transfers are data transfers being conducted by other PMs. The rest of the data transfers should be done by this PM. The PM looks through the list of leftover transfers and finds the first one it can start, and then the PM starts the identified data transfer and waits until it is done. This loop is made until either: a) there are no doable, urgent transfers (in this case, instead of waiting until such a possibility occurs, the PM takes one-by-one non-urgent postponed transfers and performs them if possible; this is a very important feature to reduce the queue of future transfers) or b) the queue of transfers necessary to be done before the i-th task becomes empty. In the latter case, starting the (i+1)-th task is allowed, and the rest of postponed transfers are passed to the following step (i.e., the (i+1)-th step).

The described strategy implements a conservative (as mathematicians say, greedy) algorithm of data transfer scheduling. It pursues the following idea: at every execution stage (PM step), do first only necessary transfers to allow starting the current planned computation step as early as possible. If no such urgent transfers are possible to be made by this PM right now (source data is not ready at another PM or destination memory is still occupied by another data at destination PM or the transfer is scheduled to another PM/DP), then do not wait and accomplish non-urgent, postponed transfers to free the local memory of PM and shorten transfer queue. As soon as possible, start the following step. All not performed and not urgent transfers (left from preceding computation steps) are batched for the future.

In Case (a), the source PM completed a previous task. As a result of this (and maybe other preceding tasks), there is a certain amount of output data. The source PM takes care of all these transmissions. In order to do that after the code performed the task and computed a certain data block, manual or automatic insertion of the code for data transfer support is performed. In order to start the transfer, this code first checks whether at least one destination PM is able to receive the data. For example, its destination memory area has to be free from other data. This can be done by means of shared synchronization objects, like a volatile (global) memory area, a semaphore, or a message queue. For example, synchronization using a volatile memory area just polls a certain memory address to determine whether the destination is ready or the transfer is complete.

On the other hand, using a semaphore may be better. In computer science, a semaphore is a variable or abstract data type that provides a simple but useful abstraction for controlling access by multiple processes to a common resource in a parallel programming environment. In the present context, the common resource is shared memory. Until a certain memory area in the destination PM is ready for data loading, the semaphore is set to the state "disabled." The destination PM switches the semaphore to the state "enabled" as soon as the destination memory area is ready to accept the data and then the following code of the destination PM runs further. The source PM runs until the occurrence of the operator of the semaphore reading, and the source PM stalls there as long as it is not allowed to proceed. As soon as the transfer is enabled, the source PM performs the transfer and runs further (into another transfer or the next task). On the other hand, the destination PM might be busy for so long a period of time that the idle time of the source PM ends and the source PM has to start the next part of computing (in order to avoid underrun). If this subsequent computing does not affect the memory area to be transferred, then the memory transfer duty is passed to the destination PM, the transfer at the source PM is skipped, and the code of the source PM runs further on until a new wait state.

In Case (b), the situation is mirrored: the source PM has prepared the data but is too busy to transfer it and continues its operation while the data is stored in its own local memory. The destination PM takes care of the transfer and performs it as soon as it has sufficient idle time, and the contents of the destination memory will not be corrupted in the course of the following computation. Thus, an "early read" occurs, since the data are loaded into the memory long before they are used.

Again, polling-based, semaphore-based, and message-based notifications (and their combinations) are possible incarnations of protocol step queries and confirmations.

Figure 5:
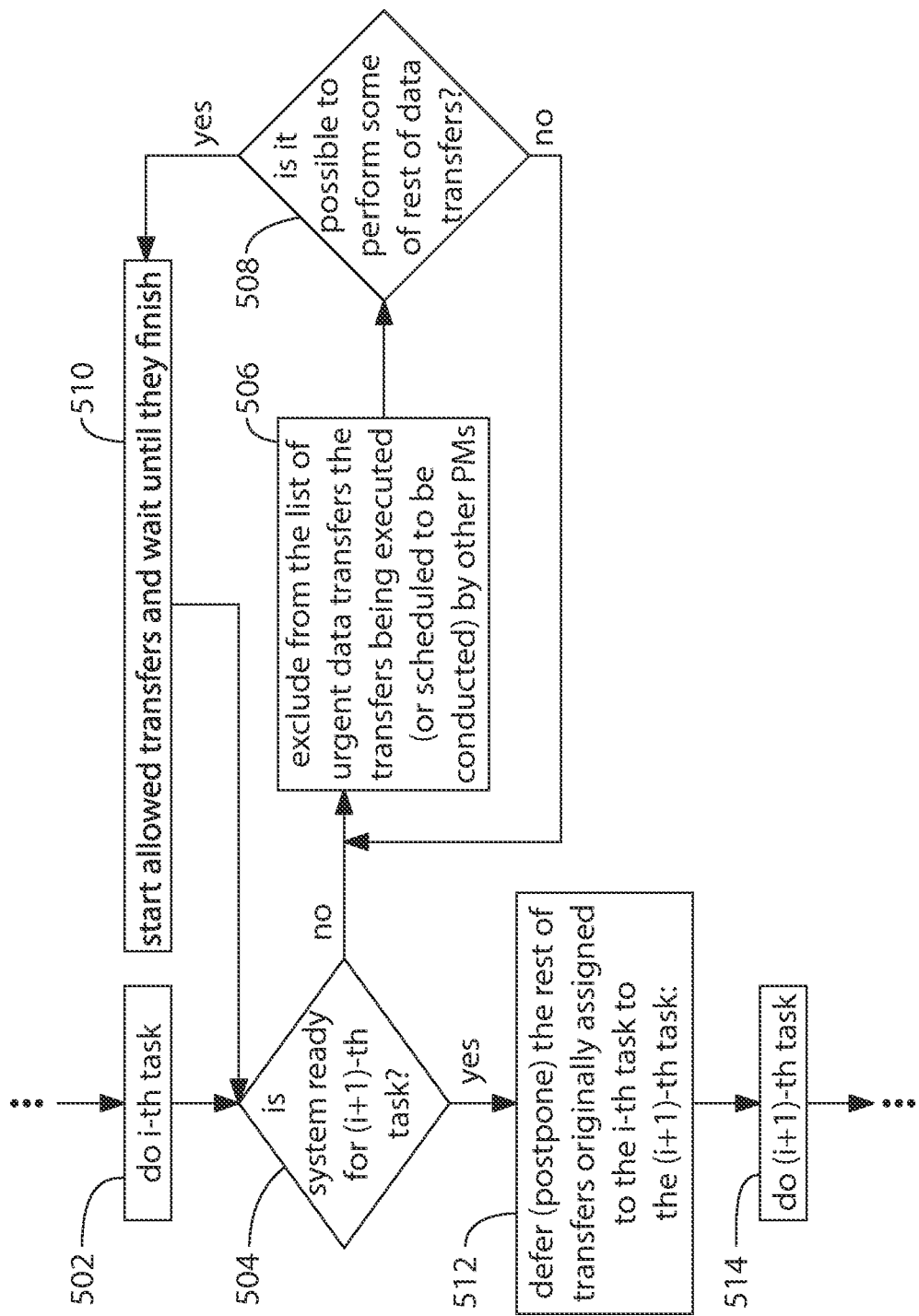
FIG. 5 shows a flow diagram representing first and second transfer strategies for semaphore-based processing.

FIG. 5 shows a flow diagram representing this first transfer strategy for semaphore-based processing covering Cases (a) and (b). The flow diagram begins at step 502 with the source PM performing the i-th task. At step 504, a controller (e.g., a designated DP 112 or host processor 150 of FIG. 1 or host processor 250 or control processor 214 of FIG. 2) determines whether the system is ready to perform the (i+1)-th task. The system is ready to perform the (i+1)-th task, if (a) all of the input data items for the (i+1)-th task are in their places and (b) all of the memory areas for temporary and output data of the (i+1)-th task are available (i.e., ready to be freed of any previous contents that are no longer needed). If not, then, in step 506, the controller refreshes the list of urgent data transfers by excluding from the list the transfers being executed (or scheduled to be conducted) by other PMs. Then, in step 508, the controller determines whether the destination PM is ready to accept the j-th data, which is the output of the i-th task. If not, then the process returns to step 506.

If the controller determines in step 508 that the destination PM is ready to accept the j-th data, then, in step 510, the source PM transfers the j-th data to the memory area in the destination PM. Processing then returns to step 504.

If, in step 504, the controller determines that the system is ready to perform the (i+1)-th task, then, in step 512, if appropriate, the j-th data transfer is deferred to the (i+1)-th task, such that transfers(i+1)=transfers_deferred(i)+transfers_own(i+1), where transfers(i+1) represents the list of all transfers to be performed by (i+1)-th task, transfers_deferred (i) represents the list of any remaining transfers from previous tasks that have not yet been performed, and transfers_own(i+1) represents the list of transfers needed for (i+1)-th task. The process then proceeds to step 514, where the source PM performs the (i+1)-th task, and so on in an iterative manner.

The waiting of step 510 does not necessary mean an endless loop with polling the condition but rather just halting the DP until the tested condition is fulfilled, exactly like in modern operating systems. Thus, actual operations can be ended even before the transfer ends. In the case of a message-driven PM, waiting until the transfer is performed means just waiting until the acknowledgement message appears in the queue. In a message-passing implementation, the source PM sends the destination PMs messages to acknowledge a ready state to receive data and, while waiting for the answers, the source PM can do something else. When the answer arrives in the form of a back message, the source PM starts the transfer. Affirmation of transfer end can also be executed in the form of a message. Therefore, direct (using volatile memory areas), semaphore-driven, and message-queue PM implementation models are supported.

In Case (c), both the source and destination DPs have no sufficient idle time slots to perform the transfer. In this case, a DMA engine (e.g., a DMA engine 130 of FIG. 1 or FIG. 2) is charged with the data exchange. In order to do that, the source or the destination DP grabs a DMA channel, programs it, and runs further tasks. In order to ensure that the DMA transfer is completed before the data block is used in the destination PM, a means of synchronization is employed. Possible implementations can be the following: (1) the DMA channel sets a semaphore to the state "disabled" until the data exchange is done, and then changes the state to "enabled" or (2) DMA management software receives and sends notifications in the form of messages. The source and destination PMs continue to read the semaphore or wait for the message before further processing is allowed.

Figure 6:
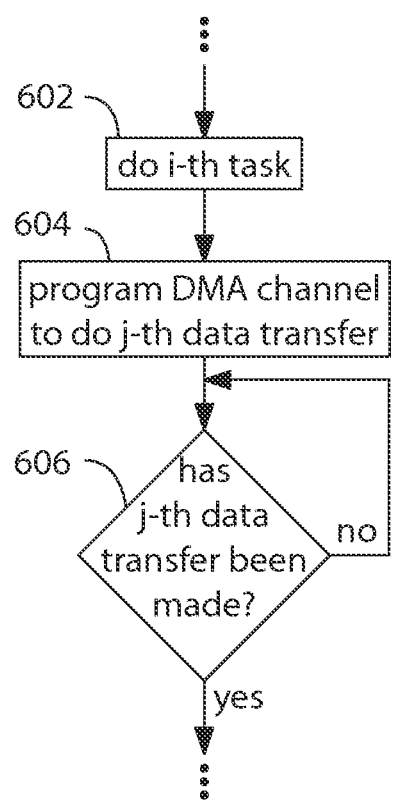
FIG. 6 shows a flow diagram representing a third transfer strategy for semaphore-based processing.

FIG. 6 shows a flow diagram representing this third transfer strategy for semaphore-based processing. The flow diagram begins at step 602 with the source PM performing the i-th task. At step 604, the controller programs the DMA channel to perform the j-th data transfer. At step 606, the controller determines whether the j-th data transfer has been completed. If not, then the process returns to step 606. If the control determines that the j-th data transfer has been completed, then the process performs the (i+1)-th task, and so on in an iterative manner.

Mixed-mode data transfers have been described, where, whenever possible, data exchange functions are implemented by DPs, instead of DMA engines, because DP operations do not adversely affect total processing time. DMA hardware is usually quite complex (in fact, advanced DMA controllers have complexity comparable to microprocessors). That is the reason why hardware developers try to minimize the number of DMA channels in order to keep chip complexity (and energy dissipation) at an admissible level. On the other hand, throughput of a DMA channel is limited by bus speed and memory access time. That is why DMA resources in real-time processing systems requiring huge data throughputs are usually deficient. In order to preserve DMA resources, the first two types of data transfers are used whenever possible. Reading/writing from/to the local memory of one processor through a bus by means of another processor is known in the state of the art. But the trick of applying those DP-based transfers instead of DMA transfers on the stage of schedule development is new, because, in regular known operating systems and RTEs, DP-based transfers can't be used effectively. The reason for this is twofold:

(1) A pure off-line scheduling module normally knows something about APM task complexities and latencies but it is unable to apply this information without additional on-line analysis of the actual situation in a given use case, and (2) A pure on-line scheduling module normally either has no deep latency information to apply DP-based transfers or has to perform a large amount of computations, even larger that the possible gain is.

Both of these known scheduling approaches as well as intermediate, combined approaches have, in the state of the art, rather big task granularity in order to achieve higher efficiency of a universal RTE. But coarse task granularity leads to impossibility to gain from DP-based transfers.

Figure 7:
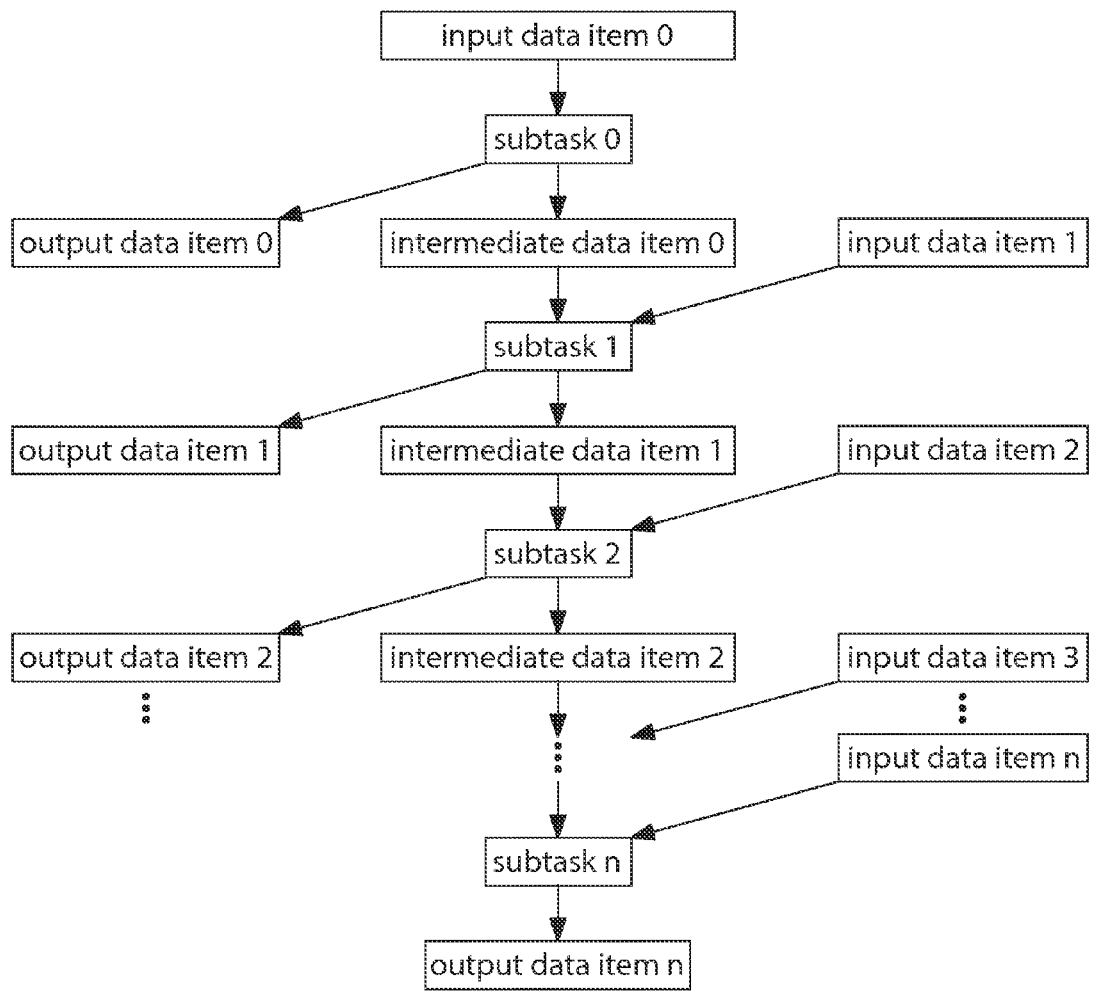
FIG. 7 represents the splitting of a task into a number of consequentially performed subtasks on the same DP.

The situation where DP-based transfers provide maximal advantage is as follows. A task can be efficiently split into a number of consequentially performed subtasks on the same DP, as shown in FIG. 7. Every subtask can have (but does not necessarily have) (a) an input data item of its own, (b) an output data item of its own, (c) an intermediate input data item (the intermediate data produced by the previous subtask), (d) an intermediate output data item (the intermediate data produced by this subtask). Intermediate data is data that is both an output of some subtask and an input to the next subtask.

Figure 8:
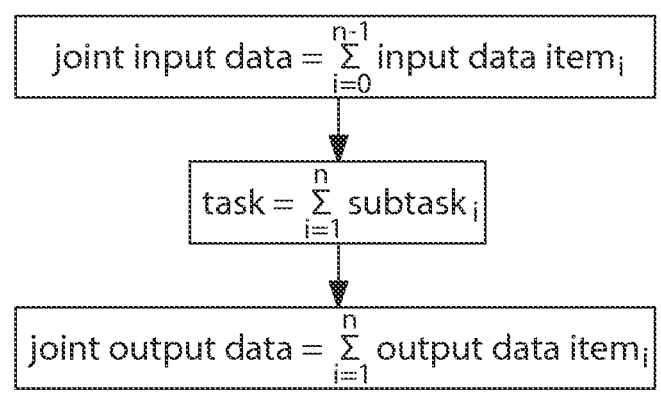
FIG. 8 represents the joining of multiple subtasks into a single task for a DP.

Splitting tasks into subtasks results in finer granularity. With coarser granularity typical for the state-of-the-art regular operating systems and RTEs, all these subtasks and input and output data items are merged together to obtain easier and more-efficient task control as presented in FIG. 8.

Figure 9:
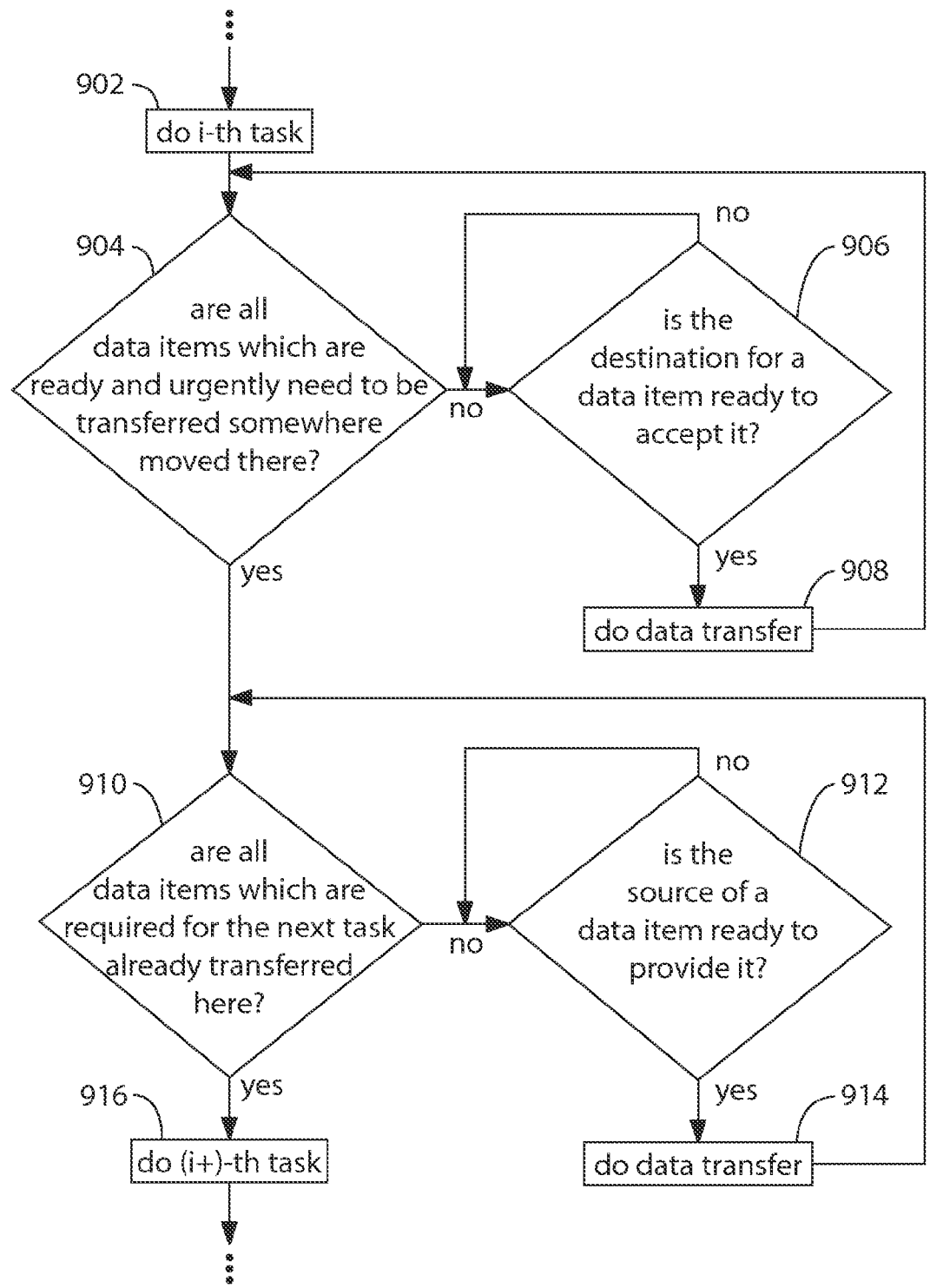
FIG. 9 shows a flow diagram representing the general data exchange framework of FIGS. 5-6.

FIG. 9 shows a flow diagram representing the general data exchange framework of FIGS. 5-6. The flow diagram begins at step 902 with the source PM performing the i-th task. At step 904, the controller determines whether all of the data items that need to be transferred somewhere have already been moved to the appropriate locations. If not, then, in step 906, the controller determines whether the destination for a particular data item is available to accept that data item. If not, then the process repeats step 906, for a different data item, if there is one, and, if not, then for the same data item. If, in step 906, the controller determines that the destination is available, then, in step 908, that particular data item is transferred and the process returns to step 904. If, in step 904, the controller determines that all of the data items that need to be transferred somewhere have already been moved to the appropriate locations, then the process proceeds to step 910, where the controller determines whether all of the data items that are required for the next task (i.e., the (i+1)-th task) have already been transferred to the source PM. If not, then, at step 912, the controller determines whether the source of a particular data item is available to provide that data item to the source PM. If not, then the process repeats step 912, for a different data item, if there is one, and, if not, then for the same data item. If, in step 912, the controller determines that the source of a particular data item is available to provide that data item to the source PM, then, in step 914, that particular data item is transferred and the process returns to step 910.

If, in step 910, the controller determines that all of the data items that are required for the next task have already been transferred to the source PM, then the process then proceeds to step 916, where the source PM performs the (i+1)-th task, and so on in an iterative manner.

Figure 10:
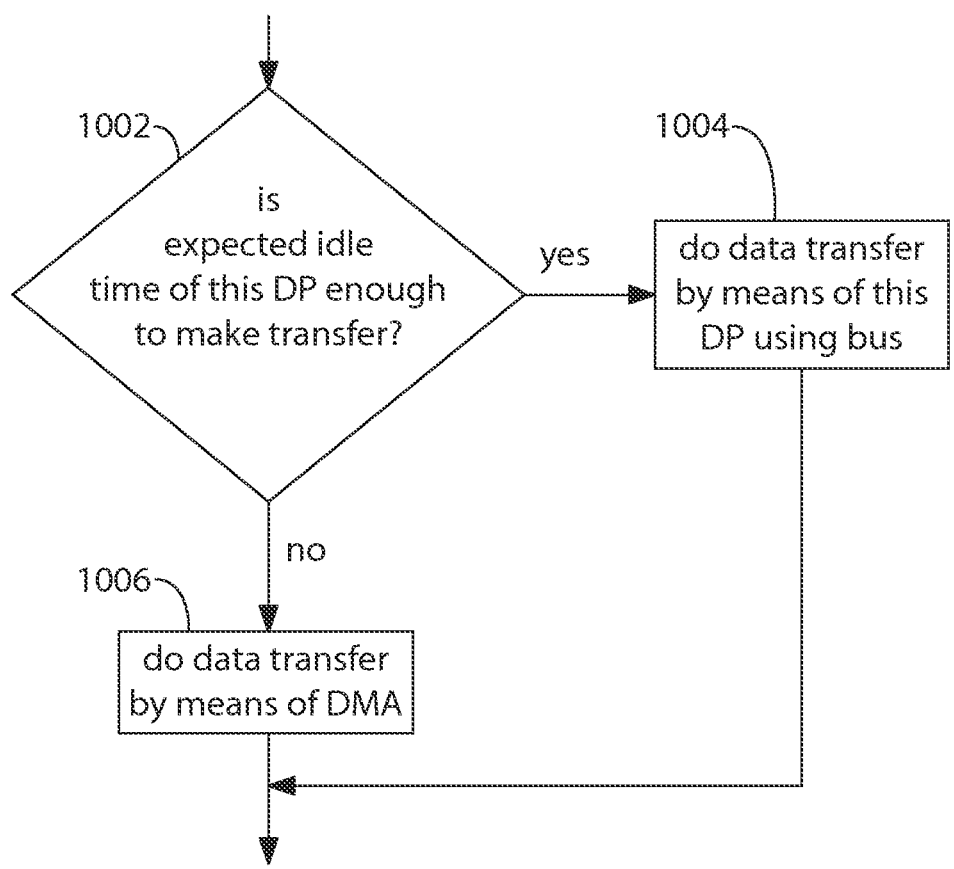
FIG. 10 shows a flow diagram representing the processing involved in transferring data.

FIG. 10 shows a flow diagram representing the processing involved in transferring data, as in steps 510, 908, and 914 of FIGS. 5 and 9. At step 1002, the controller determines whether the expected idle time of the current DP is sufficient to perform the data transfer. If so, then, in step 1004, the data transfer is performed by the DP using one or more buses (e.g., exchange bus(es) 120 of FIGS. 1 and 2 and/or trunk bus 220 of FIG. 2). Otherwise, in step 1006, the data transfer is performed by means of DMA. The selection of step 1002 is normally done off-line, at the stage of schedule template building in SBT, but, in some "flexible" situations, the selection can be performed on-line, to reflect schedule template uncertainty.

Finer granularity enables the splitting of one massive transfer (or a series of sequential smaller transfers) of joint input data and as well one massive output transfer (or smaller consequential transfers) into different small transfers. Parallelization of all of these data transfers is, as a rule, impossible, because all DMA channels usually share the same bus. Some of the small transfers are done at no cost in idle time to the corresponding DP. Other transfers are still performed using DMA, but they don't run one-after-another after the computational task ended, but in parallel with consequent computations. As finer granularity increases the number of subtasks, the scheduling graph becomes considerably more complex and gives rise to additional optimizations, including the goal of critical path reduction. The possibility of finer granularity application and related optimization is practically based on two additional restrictions:

(1) Schedule optimization is done offline, because it becomes too complex (see above); and (2) A specialized technique of task and data transfer synchronization is necessary, because known RTE and operating system concepts employ only general usage methods, which can't work effectively with large numbers of small tasks.

To keep the RTE code as tiny as possible, general-case synchronization solutions brought by the RTE or by an operating system have to be avoided. One solution is to encapsulate data exchange facilities and synchronization not only into the code of RTE but mainly into the PMs. A PM sets and resets synchronization objects or sends and receives messages and accomplishes data transfers directly without returning control to the RTE. In order to do that, small parts of service code are introduced into proper parts of original APM code. Manually doing that is a very laborious procedure; SBT does this automatically.

In Cases (a) and (b) of DP usage for data transfers, construction of synchronization objects is rather straightforward and can be deduced from FIGS. 5 and 6. Case (c) leaves more freedom for choice. For example, DMA hardware can serve for the runtime synchronization. Each DMA transfer can be configured to send tiny "transfer done" messages to both the sending and receiving module. Then, the RTE searches this message in the schedule lookup table and performs the actions described in the table. This approach minimizes the variety of synchronization objects used and allows doing all the transfers uniformly. Since DMA is anyway employed, DMA plays the uncommon role of a means of synchronization. It is very important that such synchronization is completely decentralized, which opens the way for deeper schedule optimization that is inconceivable otherwise. The key idea is that very often a PM computes blocks of data sequentially, one after another. With usual scheduling, the receiver waits until the PM ends the task completely and, only after this, the data transfer device starts sending the complete bulk-ready data to its receivers. In the present approach, data transfer can be started immediately as soon as a particular data block is ready, without waiting for the end of the PM or readiness of other data blocks. Only the last blocks are transferred after PM has been finished. Thus, most of data exchange can be done in parallel to the computations. This leads to latency decreasing and more smooth DMA and bus usage. Moreover, messages from the DMA can be grouped into vectors according to a data flow diagram. Each vector contains the complete information concerning the readiness of all input data for a certain PM to start. Vectorized DMA flags are well localized; thus, no central synchronization is required. Only deep source code inspection can discover these possibilities. This is one of the major SIET tasks. Although the idea of core-building functions of DMA is described as a part of the present scheduler approach, it can be used separately.

As a very good side effect, such construction of data exchanges and synchronization allows a very smooth and unified interface for PM management. This minimalist inventory of RTE to APM application program interface (API) functions is sufficient in all of the following possible computational tasks:

(1) load_APM (loads executable code of APM into memory of given DP), (2) init_APM (sets relatively constant values, which characterize general hardware configuration and a general set of tasks, usually called after hardware initialization or reinitialization), (3) configure_APM (sets relatively variable APM parameters, which describe current task or a limited family of tasks that can be called), and (4) run_APM (performs given APM).

It is clear that, in simple cases, some of the functions (especially init_APM and configure_APM) can be absent. If the APM executable is hardcoded and written into non-volatile memory, then the function load_APM is also not needed. In order to transfer data, up to four additional functions are needed:

(5) store_data (performs output data transfer, executed from source APM; can also support operations with global/shared/cluster memory, if any), (6) load_data (performs input data transfer, executed from destination APM; can also support operations with global/shared/cluster memory, if any), (7) store$_{data}$_DMA (programs DMA for the output data transfer, executed from source APM; can also support operations with global/shared/cluster memory, if any), and (8) load_data_DMA (programs DMA for the input data transfer, executed from destination APM; can also support operations with global/shared/cluster memory, if any).

API unification makes the portion of the RTE at any particular DP very tiny, uniform, and fast. Such a reduced API can be efficiently implemented not only in the form of direct function calls but as well as message passing. Calling mentioned API functions is equivalent to sending very short messages (32 bits are enough for most applications). Storing a queue of these messages is equivalent to storing a local part of the whole schedule that is relevant to a given DP. Thus, a sequence of messages (codes of API functions and DPs assigned to run these functions) is a complete, uniform, and very compact way to store the precomputed schedule data.

Figure 11:
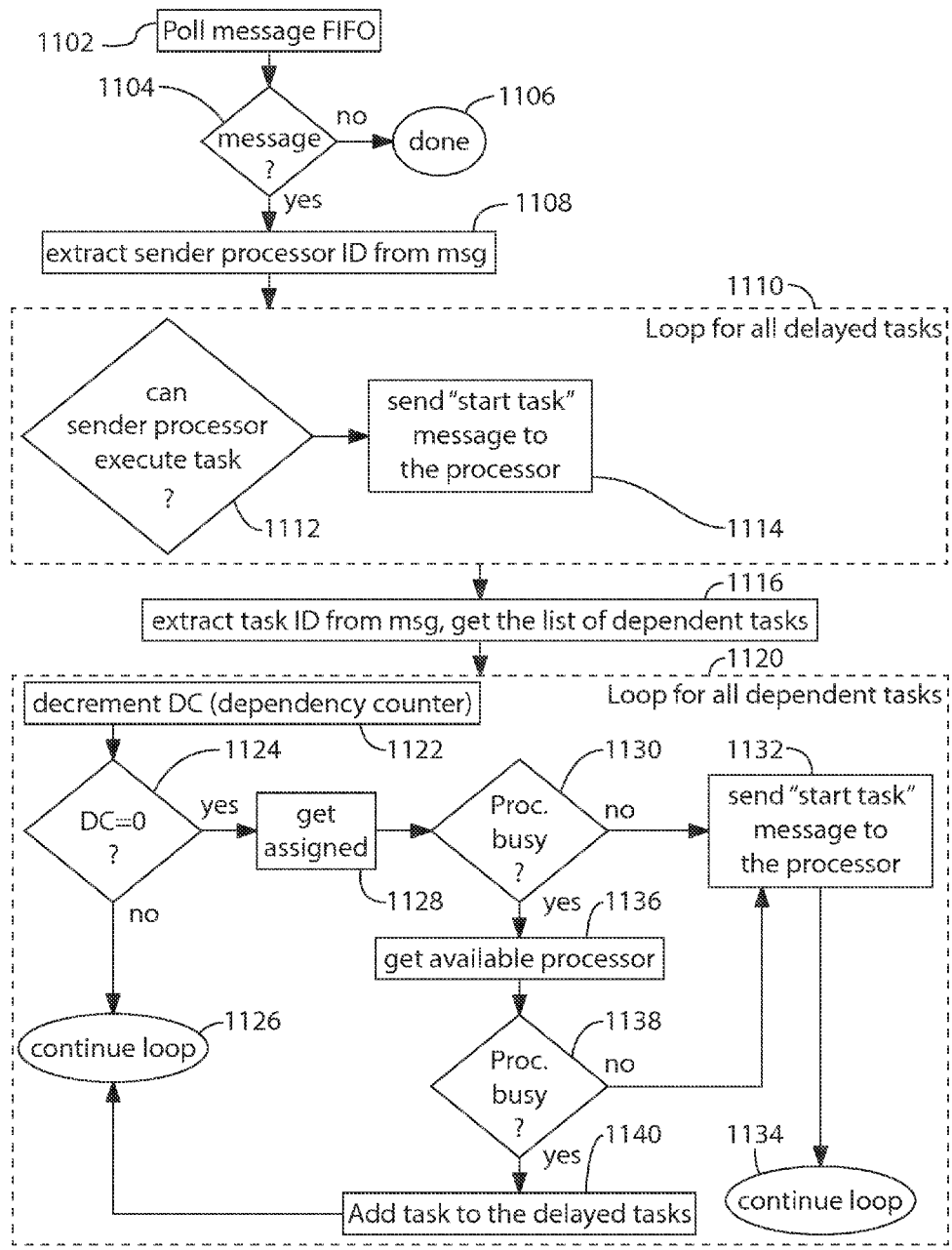
FIG. 11 shows a flow diagram of one possible implementation of message-based task processing at the host controller side.

FIG. 11 shows a flow diagram of one possible implementation of message-based task processing at the host controller side, which provides not only PM synchronization but the whole control mechanism by means of message passing. The host controller side refers to, e.g., host processor 150 of FIG. 1 or control processor 214 or host processor 250 of FIG. 2, depending on the implementation.

The whole computational schedule template is represented as a sequence of messages. When a processor completes a particular task, it sends a "task done" message to the appropriate controller. In response, the controller may send the processor that sent the "task done" message (aka the sender processor) one or more "start task" messages to instruct the sender processor to perform other tasks. Each "task done" message identifies:

(a) the sender processor;
(b) the particular task, such as configure_APM, run_APM, etc., that the sender processor just completed; and
(b) data dependencies from previous tasks.

In general, the sender processor may have one or more delayed tasks that still need to be performed. Loop 1110 of FIG. 11 handles these delayed tasks. Furthermore, the particular task that was just completed by the sender processor may have one or more dependent tasks, that is, tasks that cannot be performed until the completion of the particular task. Loop 1120 of FIG. 11 handles these dependent tasks. Depending on the particular implementation, loops 1110 and 1120 may be performed sequentially or in parallel.

In step 1102, the controller polls the FIFO memory designated to store messages to retrieve the next "task done" message, if any. If, in step 1104, the controller determines that there is no stored message, then the process is complete (step 1106). Otherwise, the process continues to step 1108, where the controller extracts, from the retrieved "task done" message, the ID of the sender processor.

The controller then implements loop 1110 for any delayed tasks to be performed by the identified sender processor. In particular, in step 1112, the controller determines whether the sender processor is able to execute its next task. If not, then the controller waits until the sender processor is ready. If and when the sender processor is ready, in step 1114, the controller sends a "start task" message to the sender processor to perform its next task. The processing of loop 1110 is repeated until all of the sender processor's delayed tasks are performed.

Depending on the particular implementation, after completing loop 1110 or while loop 1110 is still in process, the process proceeds to step 1116, where the controller extracts the task ID from the "task done" message and uses that task ID to get the list of any dependent tasks (i.e., tasks that are dependent on the identified just-completed task). This dependency information, which is a part of the schedule built by the SBT in the offline phase, can be stored either in a form of auto-generated source code (like a switch statement in C language) or as a lookup table (see section entitled "Alternative RTE Implementation Using Lookup Tables" below). The controller receives this source code/table from the host processor. In the case of several controllers, each of them receives the dependency information only for the tasks that are planned to be executed at the cluster that is controlled by this CP. This cluster assignment is also a part of the schedule.

After step 1116, the process implements loop 1120 for each dependent task in the list retrieved in step 1116. In particular, at step 1122, the controller decrements a dependency counter (DC) that was previously initialized to a pre-determined delay value for the current dependent task. Note that, if the current dependent task is one that can be performed right away, then the dependency counter can be initialized to zero. At step 1124, the controller determines if the dependency counter is equal to zero. If not, then the loop is continued at step 1126. Continuing the loop refers to the next iteration of the 1120 loop.

If and when DC=0, then it is now safe to perform the current dependent task. In that case, in step 1128, the controller assigns the dependent task to the sender processor. If, in step 1130, the controller determines that the sender processor is not busy, then, in step 1132, the controller sends a "start task" message to the sender processor, and the loop is continued at step 1134, as in step 1126.

If the controller determines that the assigned processor is busy in step 1130, then, in step 1136, the controller assigns the task to a different processor. If, in step 1138, the control determines that newly assigned processor is not busy, then, in step 1132, the controller sends a "start task" message to the assigned processor, and the loop is continued at step 1134. If the newly assigned processor is also busy, then, in step 1140, the controller adds the current task to the list of delayed tasks to be performed sometime in the future, and the loop is continued at step 1126. The processing of loop 1120 is repeated until all of the dependent tasks in the list from step 1116 are handled (i.e., either started or delayed).

To minimize complexity of PMs at other DPs in the cluster, one of the DPs can be designated to play the role of the controller. The controller supports the whole message exchange (and thus synchronization and schedule implementation) between other DPs in the cluster and the intercluster host processor (e.g., host processor 250 of FIG. 2). In this implementation, only a part of described data exchange facilities is used.

Figure 12:
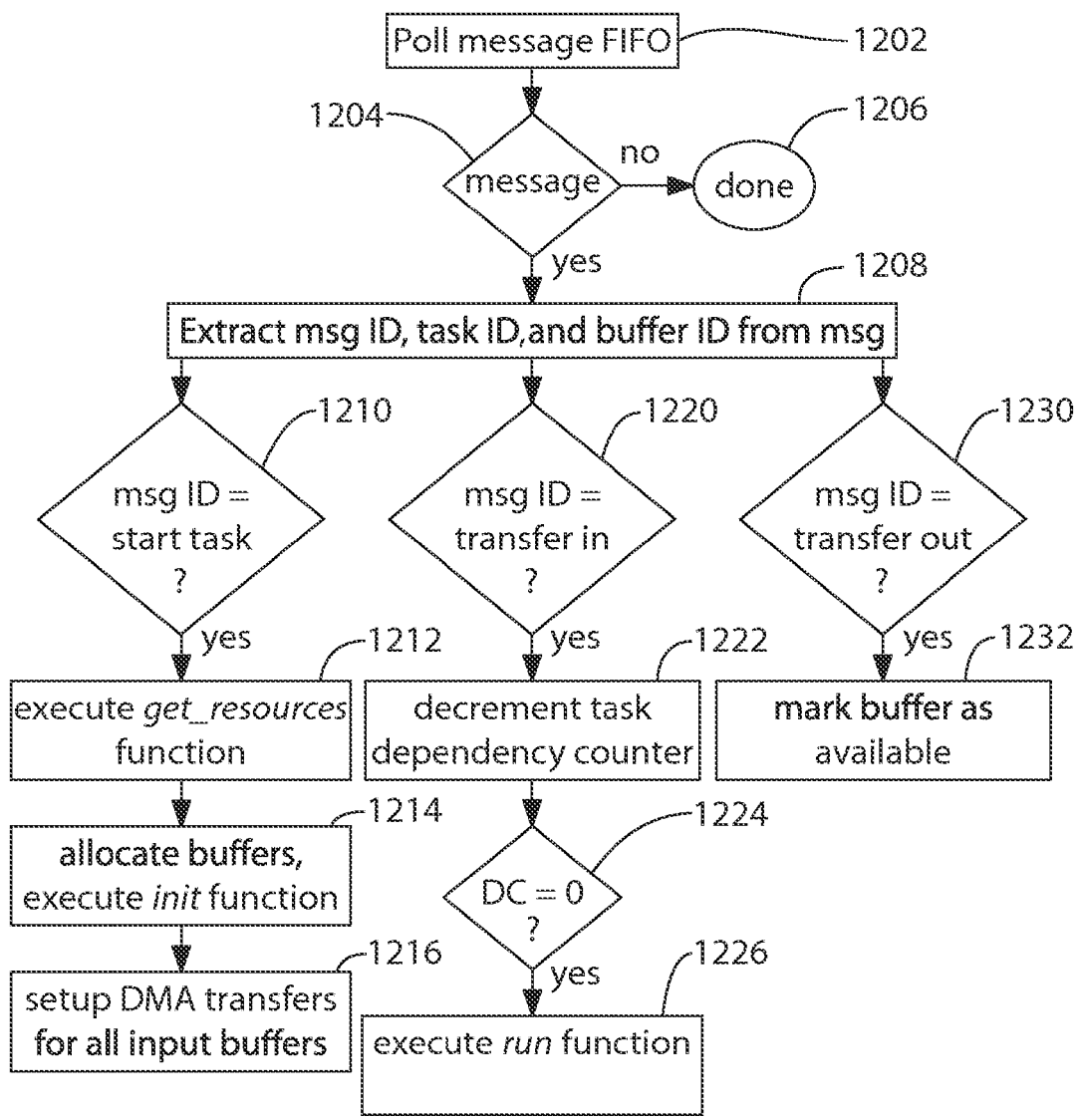
FIG. 12 shows a flow diagram of one possible implementation of message-based task processing at the DP controller side.

FIG. 12 shows a flow diagram of one possible implementation of message-based task processing at the DP controller side. The DP controller side refers to, e.g., a processor module 110 of FIG. 1. Note that the controller in FIG. 11 receives "task done" messages and sends "start task" messages, while the DP controller in FIG. 12 receives "start task," "transfer in," and "transfer out" messages and sends "task done" messages. "Transfer in" and "transfer out" messages are sent on the transfer end by the engine performing the transfer: DMA or another DP, as described at FIG. 5.

Steps 1202-1206 are analogous to steps 1102-1106 of FIG. 11. In step 1208, the DP controller extracts information from the retrieved message identifying the type of message, the task to be performed, and the buffer memory to be accessed.

If the DP controller determines, in step 1210, that the message is a "start task" message, then, in step 1212, the DP controller executes the get_resources function, which calculates the amount of memory to be allocated for the task, based on the task type and some global configuration settings. In step 1214, the DP controller allocates buffers and executes the init function, which initializes allocated buffers and other global variables depending on task type and global configuration settings. In step 1216, the DP controller sets up DMA transfers for all of the designated input buffers.

If, instead, the DP controller determines, in step 1220, that the message is a "transfer in" message, then, in step 1222, the DP controller decrements the task dependency counter until the counter is determined, in step 1224, to have been decremented to zero. At step 1226, the DP controller executes the run function, which performs the task calculations. To save the memory space, for each of the assigned tasks, the DP knows one number only—the number of input data items for this task (i.e., the initial dependency counter value). The task cannot be started until all the input data items are received. A zero value of the dependency counter identifies the possibility to start the task by calling the run function, where the input data is processed and the output data is generated.

If, instead, the DP controller determines, in step 1230, that the message is a "transfer out" message, then, in step 1232, the DP controller marks the designated buffer as available. During the outgoing transfer, the buffer containing the output data cannot be used for other purposes. The "transfer out" message identifies that the outgoing transfer is done, and the DP can now use this buffer for other purposes.

The above-described behavior allows varying start moments of the task execution and data transfer, and even the sequence of the task execution, depending on the runtime situation. This flexibility is important because the duration of the tasks and transfers may differ, sometimes significantly, from the time and data size estimations used by the SBT in the offline phase. Assuming that the SBT builds a (nearly) optimal schedule for those estimations, the CP varies this schedule to utilize the DP availability and the memory and bus capacities. If the durations of the tasks and/or transfers differ significantly from the estimations, then the CP is unable to build a (sub)optimal schedule because of its limited computational resources. Nevertheless, even this packet will be processed correctly, and, for the next packet, the optimal schedule will be used again.

Even this reduced implementation shows advantages of fine granularity and flexible data transfers to achieve efficient scheduling. This example illustrates that the solutions shown in FIGS. 5 and 6 can be (a) used together, (b) arbitrarily combined, or (c) used separately to obtain throughout transfer latency reduction.

Alternative RTE Implementation Using Lookup Tables

In some particular cases, because of the restrictions on the instruction set memory size, the auto-generated schedule source code cannot be used. In such a case, the RTE can be reduced to the uniform kernel, and the generated schedule is saved as a set of lookup tables, which can be loaded from the shared memory when necessary. This approach decreases the memory requirements dramatically, but adds delays for loading and parsing lookup tables.

Real Run/Simulation

Real run/simulation covers either running APMs bound to RPMs in real hardware or with its clock accurate and bit exact software simulator. Real run/simulation serves the following goals:
- Checking hardware model: simulates the runtime behavior of the main hardware modules: DMA, buses, etc.;
- Testing RTE code: can provide, for example, DMA "transfer done" messages for the schedule synchronization;
- Testing PM behavior and scheduling using wider use case suit;
- Basic use case set improvement; and
- Debugging.

Black Box Simulation

Black box simulation serves as a means of covering a huge number of big use cases in order to gather large-scale timing information which was not covered with given basic use cases. Black box simulation:
- a) Verifies whether a generated schedule stays (sub)optimal for a wider class of use cases;
- b) Delivers total cycle counts relatively fast; and
- c) Helps finding better basic use case sets to achieve robust scheduling.

Advantages

Characteristic features and options of the scheduling framework described above may include one or more of the following:
- The task of scheduling is split into multiple steps, where the most time-consuming steps are made automatically offline, i.e., before starting the application;
- Not only heterogeneous computer architectures are supported, but the more restrictions there are, the faster the off-line optimization runs;
- The decision of what program module will be run on what dedicated processor depends on their compatibility and the generated schedule;
- Scheduling comprises consequent stages: source code and linkage information analysis (produces data dependencies and information about application module compatibility to a type of dedicated processor), schedule optimization, synchronization objects optimization and assignment, data transfer optimization, processor-centric schedule decomposition, runtime program modules generation, and runtime program modules usage. All the stages except the last one can be performed in advance;
- The resulting schedule has a compact and unusual representation: it is not a data structure but a set of compact runtime program modules serving as wrappers for application program modules and providing synchronization and data transfers;
- Runtime program modules have minimal complexity and support a distributed control model; therefore, there is no need to maintain a resources-consuming centralized scheduler;
- Module synchronization is optimized to minimize the overall complexity and amount of synchronization events. Module synchronization is achieved based on dataflow critical path analysis and is performed in a decentralized way;
- Instead of waiting for a synchronization event, the idle time of distinct processors can be occupied with data transfers in order to minimize total cycle count;
- There are no limitations either in the diversity of dedicated processors or in the synchronization mechanisms and data transfer mechanisms (DMA, processor-driven) used; and Although the schedule template is produced beforehand, it does not exclude the possibility of dynamic scheduling if application modules have data-dependent cycle counts. This is possible using a data- and settings-dependent complexity model for every model cycle count. The data for this model can be extracted automatically from application program module source code. The off-line scheduler is capable of building either a worst-case-optimized schedule or a schedule template. The latter is introduced into runtime program modules. Depending on the actual data and settings, one or other precomputed schedule is invoked on the fly.

The scheduling framework is most advantageous in computer systems performing complex computations with possible parallelization and a limited amount of branching and data- and settings-dependent complexity factors. The most crucial premise is predictability of runtime cycles for each module (in particular, based on source codes). Cycles amount is extracted automatically in the course of program module analysis. This scheduling method is best tailored for heterogeneous multi-processor systems such as those for broadband and multi-user communications (such as baseband, VoIP), digital video processing (e.g., encoding, transcoding), virtual reality and virtual presence environments, large-scale Monte-Carlo simulation, uniform vectorized and matrix calculus, and real-time process control. Common features include:

- All *APMs* and graphs of dependencies are known before run time; and
- The amount of cycles for each meaningful pair of *APM* and *DP* can be obtained automatically based on the *APM*.

The scheduling framework allows (but not necessarily requires) deep integration with the programmer's toolkit (make, compiler, linker, profiler) and enjoys additional advantages over it.

The present invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, general-purpose computer, or other processor.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A machine-implemented method for programming a heterogeneous multi-processor computer system to run a plurality of program modules, wherein each program module is to be run on one of the processors, the system comprising a plurality of processors of two or more different processor types, the method comprising:

(a) performing machine-implemented offline processing using a program module applicability analyzer (PMAA) and a plurality of SBT tools of a schedule building toolkit (SBT), wherein:

the PMAA determines which processor types are capable of running which program modules;

the PMAA receives information corresponding to memory allocation for the first processor;

the PMAA receives data size requirements for the first program module;

the PMAA computes a total memory requirement for the first program module based on the data size requirements;

the PMAA compares the total memory requirement for the first program module with the memory allocation for the first processor;

the PMAA determines that the first processor cannot run the first program module if the total memory requirement is greater than the memory allocation;

the PMAA receives information corresponding to data transfer capabilities for the first processor;

the PMAA receives data transfer requirements for the first program module;

the PMAA computes an average data transfer utilization for the first program module based on the data transfer requirements;

the PMAA compares the average data transfer utilization for the first program module with the data transfer capabilities for the first processor;

the PMAA determines that the first processor cannot run the first program module if the average data transfer utilization is greater than the data transfer capabilities; and the plurality of SBT tools comprise:
(i) a schedule builder that selects a subset of one or more different schedule solutions based on a first set of use cases; and
(ii) a source code generator that generates scheduling software for a selected schedule solution, wherein the scheduling software is to be run on one or more of the processors; and (b) performing machine-implemented online processing using realtime data to test the scheduling software and the selected schedule solution, wherein:

the PMAA determines whether a first processor of a first processor type is capable of running a first program module without compiling the first program module.

2. The method of claim 1, wherein:
the PMAA receives information corresponding to data transfer capabilities for the first processor;
the PMAA receives data transfer requirements for the first program module;
the PMAA computes an average data transfer utilization for the first program module based on the data transfer requirements;
the PMAA compares the average data transfer utilization for the first program module with the data transfer capabilities for the first processor; and
the PMAA determines that the first processor cannot run the first program module if the average data transfer utilization is greater than the data transfer capabilities.

3. The method of claim 1, further comprising, after step (a) and before step (b), the step of performing a blackbox simulation to test the scheduling software and the selected schedule solution on a second set of use cases larger than the first set, wherein the plurality of SBT tools further comprise a profiling and modeling code generator that generates software for the blackbox simulation.

4. The method of claim 1, wherein the plurality of processors comprise at least $N_1$ processors of a first processor type and $N_2$ processors of a second processor type different from the first processor type, wherein at least one of $N_1$ and $N_2$ is greater than 1.

5. The method of claim 4, wherein both $N_1$ and $N_2$ are greater than 1.

6. The method of claim 1, wherein at least part of the offline processing of step (a) is repeated after performing the online processing of step (b) to modify one or more of the scheduling software and the selected schedule solution.

7. The method of claim 1, wherein the PMAA is one of a plurality of SIET tools of a scheduling information extracting toolkit (SIET) wherein:
the plurality of SIET tools further comprise one or more of:
(i) a cycle analyzer that determines timing requirements for each program module running on each capable processor type;
(ii) a dependency analyzer that determines data input and output dependencies between different program modules running on capable processor types; and
(iii) a data exchange analyzer that determines data transfer requirements between different program modules running on capable processor types.

8. The method of claim 1, wherein the SBT tools further comprise one or more of:
(i) an interconnection optimizer that compares the different schedule solutions corresponding to different possible assignments of the program modules to the processors; and
(ii) a synchronization optimizer that develops a synchronization scheme for the subset of schedule solutions.

9. A machine-implemented method for programming a multi-processor computer system to run a plurality of program modules, wherein each program module is to be run on one of the processors, the system comprising a plurality of processors of two or more different processor types, the method comprising:

(a) performing machine-implemented offline processing using a program module applicability analyzer (PMAA) and a plurality of SBT tools of a schedule building toolkit (SBT), wherein:
the PMAA determines which processor types are capable of running which program modules;
the PMAA determines that the first processor cannot run the first program module if a total memory requirement is greater than a memory allocation;
the PMAA determines that the first processor cannot run the first program module if an average data transfer utilization is greater than data transfer capabilities; and
the plurality of SBT tools comprise:
(i) a schedule builder that selects a subset of one or more different schedule solutions based on a first set of use cases; and
(ii) a source code generator that generates scheduling software for a selected schedule solution, wherein the scheduling software is to be run on one or more of the processors;

(b) performing a blackbox simulation to test the scheduling software and the selected schedule solution on a second set of use cases larger than the first set, wherein the plurality of SBT tools further comprise a profiling and modeling code generator that generates software for the blackbox simulation; and (c) performing machine-implemented online processing using realtime data to test the scheduling software and the selected schedule solution, wherein:

the PMAA determines whether a first processor of a first processor type is capable of running a first program module without compiling the first program module.

10. The method of claim 9, wherein:

the PMAA receives information corresponding to memory allocation for the first processor;

the PMAA receives data size requirements for the first program module;

the PMAA computes a total memory requirement for the first program module based on the data size requirements; and the PMAA compares the total memory requirement for the first program module with the memory allocation for the first processor.

11. The method of claim 10, wherein:

the PMAA receives information corresponding to data transfer capabilities for the first processor;

the PMAA receives data transfer requirements for the first program module;

the PMAA computes an average data transfer utilization for the first program module based on the data transfer requirements; and the PMAA compares the average data transfer utilization for the first program module with the data transfer capabilities for the first processor.

12. The method of claim 9, wherein:

the PMAA receives information corresponding to data transfer capabilities for the first processor;

the PMAA receives data transfer requirements for the first program module;

the PMAA computes an average data transfer utilization for the first program module based on the data transfer requirements;

the PMAA compares the average data transfer utilization for the first program module with the data transfer capabilities for the first processor; and the PMAA determines that the first processor cannot run the first program module if the average data transfer utilization is greater than the data transfer capabilities.

13. The method of claim 9, wherein the plurality of processors comprise at least $N_1$ processors of a first processor type and $N_2$ processors of a second processor type different from the first processor type, wherein at least one of $N_1$ and $N_2$ is greater than 1.

14. The method of claim 13, wherein both $N_1$ and $N_2$ are greater than 1.

15. The method of claim 9, wherein at least part of the offline processing of step (a) is repeated after performing the online processing of step (b) to modify one or more of the scheduling software and the selected schedule solution.

16. The method of claim 9, wherein the PMAA is one of a plurality of SIET tools of a scheduling information extracting toolkit (SIET) wherein:

the plurality of SIET tools further comprise one or more of:
(i) a cycle analyzer that determines timing requirements for each program module running on each capable processor type;
(ii) a dependency analyzer that determines data input and output dependencies between different program modules running on capable processor types; and
(iii) a data exchange analyzer that determines data transfer requirements between different program modules running on capable processor types.

17. The method of claim 9, wherein the SBT tools further comprise one or more of:
(i) an interconnection optimizer that compares the different schedule solutions corresponding to different possible assignments of the program modules to the processors; and
(ii) a synchronization optimizer that develops a synchronization scheme for the subset of schedule solutions.

18. A machine-implemented method for programming a multi-processor computer system to run a plurality of program modules, wherein each program module is to be run on one of the processors, the system comprising a plurality of processors of two or more different processor types, the method comprising:

(a) performing machine-implemented offline processing using a program module applicability analyzer (PMAA) and a plurality of SBT tools of a schedule building toolkit (SBT), wherein:

the PMAA determines which processor types are capable of running which program modules;

the PMAA receives information corresponding to memory allocation for the first processor;

the PMAA receives data size requirements for the first program module;

the PMAA computes a total memory requirement for the first program module based on the data size requirements;

the PMAA compares the total memory requirement for the first program module with the memory allocation for the first processor;

the PMAA determines that the first processor cannot run the first program module if the total memory requirement is greater than the memory allocation;

the PMAA determines that the first processor cannot run the first program module if an average data transfer utilization is greater than data transfer capabilities; and the plurality of SBT tools comprise:
(i) a schedule builder that selects a subset of one or more different schedule solutions based on a first set of use cases; and
(ii) a source code generator that generates scheduling software for a selected schedule solution, wherein the scheduling software is to be run on one or more of the processors; and (b) performing machine-implemented online processing using realtime data to test the scheduling software and the selected schedule solution, wherein:

the PMAA determines whether a first processor of a first processor type is capable of running a first program module without compiling the first program module.

19. The method of claim 18, wherein the plurality of processors comprise at least $N_1$ processors of a first processor type and $N_2$ processors of a second processor type different from the first processor type, wherein at least one of $N_1$ and $N_2$ is greater than 1.

20. The method of claim 19, wherein both $N_1$ and $N_2$ are greater than 1.

* * * * *